US012082238B2

(12) United States Patent  
Jung et al.

(10) Patent No.: US 12,082,238 B2  
(45) Date of Patent: Sep. 3, 2024

(54) CONTROL INFORMATION TRANSMISSION METHOD AND DEVICE IN WIRELESS COMMUNICATION SYSTEM

(71) Applicant: Samsung Electronics Co., Ltd., Gyeonggi-do (KR)

(72) Inventors: Euichang Jung, Gyeonggi-do (KR); Suha Yoon, Gyeonggi-do (KR); Hoondong Noh, Gyeonggi-do (KR); Jeongho Yeo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 248 days.

(21) Appl. No.: 17/611,439

(22) PCT Filed: May 13, 2020

(86) PCT No.: PCT/KR2020/006301  
§ 371 (c)(1),  
(2) Date: Nov. 15, 2021

(87) PCT Pub. No.: WO2020/231182  
PCT Pub. Date: Nov. 19, 2020

(65) Prior Publication Data  
US 2022/0248411 A1 Aug. 4, 2022

(30) Foreign Application Priority Data  
May 14, 2019 (KR) .......... 10-2019-0056517  
May 13, 2020 (KR) .......... 10-2020-0057043

(51) Int. Cl.  
*H04W 72/10* (2009.01)  
*H04L 1/1829* (2023.01)  
(Continued)

(52) U.S. Cl.  
CPC .......... *H04W 72/56* (2023.01); *H04L 1/1861* (2013.01); *H04W 72/21* (2023.01); *H04W 72/23* (2023.01)

(58) Field of Classification Search  
CPC ........ H04B 7/06; H04L 1/1861; H04W 16/28; H04W 72/21; H04W 72/23; H04W 72/56; H04W 72/569  
(Continued)

(56) References Cited

U.S. PATENT DOCUMENTS 10,819,408 B2   10/2020   Park et al.  
2013/0114455 A1   5/2013   Yoo et al.  
(Continued)

FOREIGN PATENT DOCUMENTS

KR   10-2018-0018430   2/2018  
KR   10-2019-0028796   3/2019

OTHER PUBLICATIONS

Vivo, "UL Intra UE Tx Prioritization for URLLC", R1-1901698, 3GPP TSG RAN WG1 #96, Feb. 25-Mar. 1, 2019, 5 pages.  
(Continued)

*Primary Examiner* — Robert J Lopata  
(74) *Attorney, Agent, or Firm* — The Farrell Law Firm, P.C.

(57) ABSTRACT

The present disclosure relates to a communication technique for converging IoT technology with a 5G communication system for supporting a higher data transmission rate beyond a 4G system, and a system therefor. The present disclosure may be applied to an intelligent service (for example, a smart home, a smart building, a smart city, a smart car or connected car, health care, digital education, retail business, a security and safety-related service, etc.) on the basis of 5G communication technology and IoT-related technology. According to one embodiment of the present disclosure, a (Continued)

method of a terminal of a communication system comprises: receiving, from a base station, first downlink control information (DCI) including first priority information; receiving, from the base station, second DCI including second priority information; checking whether a first uplink transmission resource, associated with the first DCI, and a second uplink transmission resource, associated with second DCI, overlap on a time axis; and if the first uplink transmission resource and the second uplink transmission resource overlap on the time axis, carrying out uplink transmission for the higher priority information on the basis of the first priority information and the second priority information.

12 Claims, 19 Drawing Sheets

(51) Int. Cl.
  *H04W 72/21* (2023.01)
  *H04W 72/23* (2023.01)
  *H04W 72/56* (2023.01)
(58) Field of Classification Search
  USPC .......................................................... 370/329
  See application file for complete search history.

(56) References Cited

U.S. PATENT DOCUMENTS

| | | | |
|---|---|---|---|
| 2014/0376471 A1 | 12/2014 | Nishio et al. | |
| 2019/0173562 A1 | 6/2019 | Yu et al. | |
| 2021/0400685 A1* | 12/2021 | Jiao | H04W 72/1268 |
| 2022/0078812 A1* | 3/2022 | Fu | H04W 52/146 |
| 2022/0141808 A1* | 5/2022 | Xu | H04W 72/23 370/329 |
| 2022/0225400 A1* | 7/2022 | Wong | H04L 1/1854 |
| 2022/0232541 A1* | 7/2022 | Xu | H04L 1/1614 |

OTHER PUBLICATIONS

European Search Report dated Jun. 8, 2022 issued in counterpart application No. 20804785.2-1215, 9 pages.
PCT/ISA/210 Search Report issued on PCT/KR2020/006301, Aug. 11, 2020, pp. 5.
PCT/ISA/237 Written Opinion issued on PCT/KR2020/006301, Aug. 11, 2020, pp. 8.
Interdigital, Inc., Intra-UE Prioritization/Multiplexing for Scenarios 2-5', R1-1902612, 3GPP TSG RAN WG1 Meeting #96, Athens, Greece, Feb. 16, 2019, pp. 8.
ZTE, 'On Inter-UE multiplexing between eMBB and URLLC', R1-1808212, 3GPP TSG RAN WG1 Meeting #94, Gothenburg, Sweden, Aug. 11, 2018, pp. 8.
Wilus Inc., 'On UCI enhancement for NR URLLC', R1-1907385, 3GPP TSG RAN WG1 Meeting #97, Reno, USA, May 4, 2019, pp. 9.
Mediatek Inc., 'Multiple HARQ procedures and intra-UE UCI prioritization', R1-1906566, 3GPP TSG RAN WG1 Meeting #97, Reno, USA, May 4, 2019, pp. 13.
Japanese Office Action dated Apr. 15, 2024 issued in counterpart application No. 2021-568346, 6 pages.

* cited by examiner

CONTROL INFORMATION TRANSMISSION METHOD AND DEVICE IN WIRELESS COMMUNICATION SYSTEM

PRIORITY

This application is a National Phase Entry of PCT International Application No. PCT/KR2020/006301, which was filed on May 13, 2020, and claims priority to Korean Patent Application Nos. 10-2019-0056517 and 10-2020-0057043, which were filed on May 14, 2019 and May 13, 2020, respectively, the content of each of which is incorporated herein by reference.

TECHNICAL FIELD

The disclosure relates to a wireless communication system and, more particularly, to a control information transmission method.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post LTE" system. The 5G communication system defined by 3GPP is called a "New Radio (NR) system". The 5G communication system is considered to be implemented in higher frequency (mm-Wave) bands (e.g., 60 GHz bands) so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, large scale antenna techniques have been discussed in 5G communication systems and applied to the NR system. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology. With the advance of warless communication systems as described above, various services can be provided, and accordingly there is a need for schemes to effectively provide these services.

DISCLOSURE OF INVENTION

Technical Problem

The disclosure provides various methods and apparatuses for transmitting uplink control information and data by a terminal.

Solution to Problem

In order to solve the above-mentioned problems, according to the disclosure, a transmission/reception operation performed by a UE using a plurality of panels may include: performing Tx/Rx beamforming using one or at least two or more panels according to a MPUE (multi-panel user equipment) type by the UE; after performing the beamforming, receiving, by the UE, each beam transmitted from a plurality of base stations or a plurality of beams transmitted from one base station within one slot; identifying DCI information of PDCCH in the plurality of received beams; and determining single-panel transmission and multi-panel transmission by determining PDCCH or PUSCH transmission indicated in the DCT information.

In addition, a method of a UE of a communication system may include: receiving first downlink control information (DCI) including first priority information from a base station; receiving second DCI including second priority information from the base station; identifying whether a first uplink transmission resource related to the first DCI and a second uplink transmission resource related to the second DCI overlap on a time axis; and performing uplink transmission corresponding to higher priority information, based on the first priority information and the second priority information, when the first uplink transmission resource and the second uplink transmission resource overlap on the time axis.

In addition, a method of a base station of a communication system may include: transmitting first downlink control information (DCI) including first priority information to a UE; transmitting second DCI including second priority information to the UE; identifying whether a first uplink transmission resource related to the first DCI and a second uplink transmission resource related to the second DCI overlap on a time axis; and receiving uplink transmission corresponding to higher priority information performed by the UE, based on the first priority information and the second priority information, when the first uplink transmission resource and the second uplink transmission resource overlap on the time axis.

In addition, a UE of a communication system may include: a transceiver; and a controller connected to the transceiver and configured to control to receive first downlink control information (DCI) including first priority information from a base station, receive second DCI including second priority information from the base station, identify whether a first uplink transmission resource related to the first DCI and a second uplink transmission resource related to the second DCI overlap on a time axis, and perform uplink transmission corresponding to higher priority information, based on the first priority information and the second priority information, when the first uplink transmission resource and the second uplink transmission resource overlap on the time axis.

In addition, a base station of a communication system may include: a transceiver; and a controller connected to the transceiver and configured to control to transmit first downlink control information (DCI) including first priority information to a UE, transmit second DCI including second priority information to the UE, identify whether a first uplink transmission resource related to the first DCI and a second uplink transmission resource related to the second DCI overlap on a time axis, and receive uplink transmission corresponding to higher priority information performed by the UE, based on the first priority information and the second priority information, when the first uplink transmission resource and the second uplink transmission resource overlap on the time axis.

Advantageous Effects of Invention

According to an embodiment of the disclosure, uplink control information and data may be effectively transmitted in a wireless communication system.

MODE FOR THE INVENTION

Figure 1:
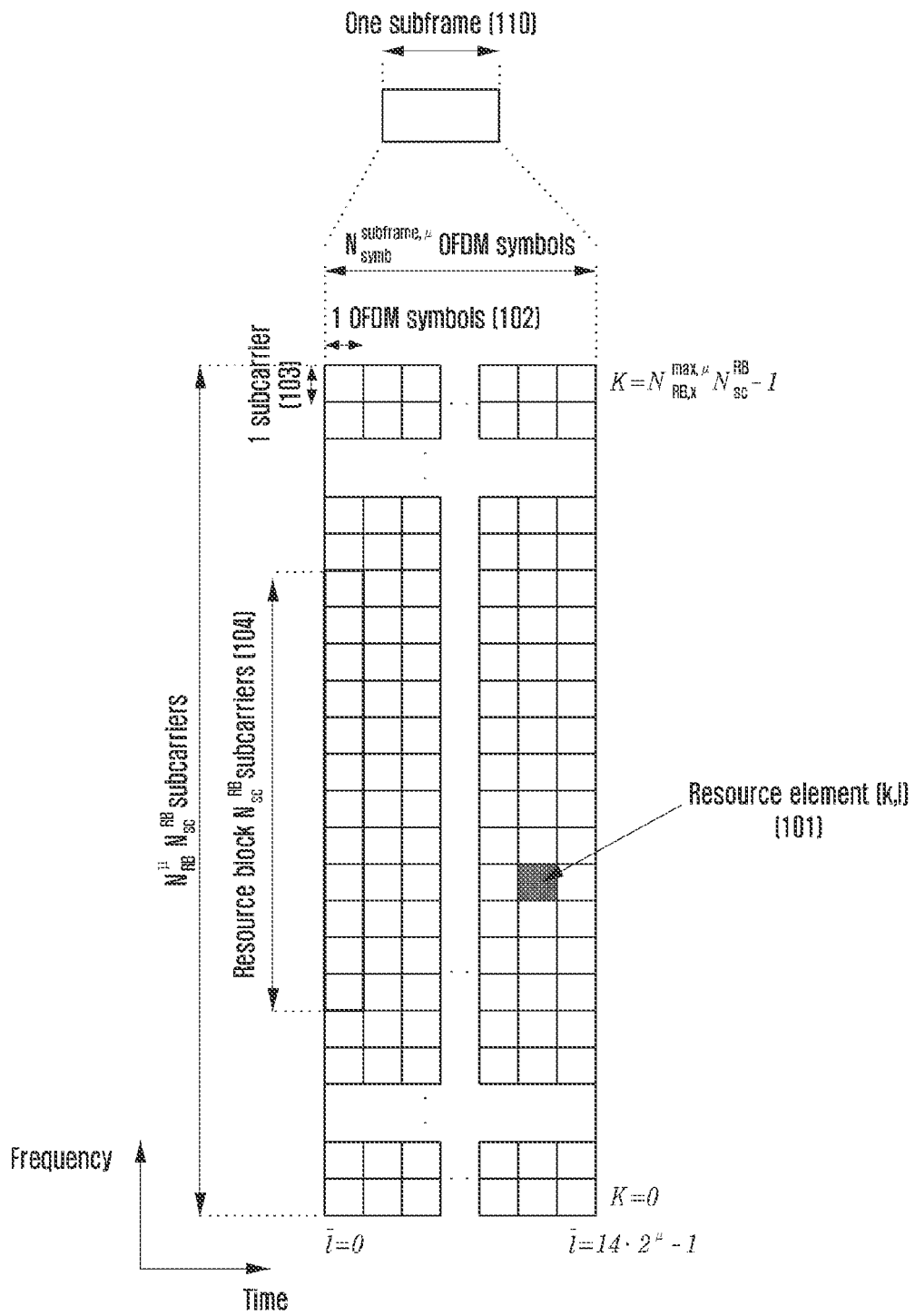
FIG. 1 is a diagram illustrating a basic structure of a time-frequency domain of a 5G communication system.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, although the following description may be directed to an LTE or LTE-A system by way of example, embodiments of the disclosure may also be applied to other communication systems having similar technical backgrounds or channel types to the embodiments of the disclosure. Examples of other communication systems may include 5th generation mobile communication technologies (5G, new radio, NR) developed beyond LTE-A, and in the following description, the "5G" may be a concept that covers exiting LTE, LTE-A, and other similar services. In addition, based on determinations by those skilled in the art, the disclosure may be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks. Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system has evolved from providing an initial voice-oriented service to a broadband wireless communication system that provides high-speed and high-quality packet data services, such as high speed packet access (HSPA) in 3GPP, long-term evolution (LTE) or evolved universal terrestrial radio access (E-UTRA), LTE-advanced (LTE-A), LTE-pro, high rate packet data (HRPD) in 3GPP2, ultra-mobile broadband (UMB), and communication standards such as IEEE's 802.16e.

In the LTE system, which is a representative example of the broadband wireless communication system, in downlink (DL), orthogonal frequency division multiplexing (OFDM) or cyclic prefix-OFDM (CP-OFDM) scheme is adopted, and in uplink (UL), single carrier frequency division multiple access (SC-FDMA) scheme is adopted. Uplink refers to a radio link in which a UE (user equipment (UE) or mobile station (MS)) transmits data or control signals to a base station (eNode B or base station (BS)), and downlink refers to a radio link in which a base station transmits data or control signals to the UE. The above-described multiple access method allows the data or control information of each user to be distinguished by allocating and operating the time-frequency resources to which the data or control information for each user are to be transmitted do not overlap each other, that is, to establish orthogonality.

The 5G communication system, which is a communication system after LTE, must support services that simultaneously satisfy various requirements so that various requirements from users and service providers can be freely reflected. Services considered for the 5G communication system include enhanced mobile broadband (eMBB), massive machine type communication, (mMTC), and Ultra reliability low latency communication (URLLC).

The eMBB aims to provide more improved data transfer rates than those supported by existing LTE, LTE-A or LTE-Pro. For example, in the 5G communication system, the eMBB should be able to provide a peak data rate of 20 Gbps in the downlink and a peak data rate of 10 Gbps in the uplink from the viewpoint of one base station. In addition, the 5G communication system must provide the peak data rate and, at the same time, provide the increased user perceived data rate of the UE. To satisfy such a requirement, improved various transmission/reception technologies including a more advanced multi-antenna (multi input multi output, (MIMO)) transmission technology are required. In addition, in the LTE system, a signal is transmitted using a transmission bandwidth of up to 20 MHz in the 2 GHz band, whereas the 5G communication system can satisfy the data transmission rate required by the 5G communication system by using a frequency bandwidth wider than 20 MHz in a frequency band of 3 to 6 GHz or 6 GHz or more.

At the same time, mMTC is being considered to support application services such as the Internet of Things (IoT) in the 5G communication system. To efficiently provide the Internet of Things, mMTC requires access support for large-scale UEs within a cell, improvement of coverage of UEs, improved battery life, and reduction of costs of UEs. Because the Internet of Things is attached to various sensors and various devices to provide communication functions, it must be able to support many UEs (e.g., 1,000,000 UEs/km2) within a cell. In addition, because a UE supporting mMTC is highly likely to be in a shaded area that a cell cannot cover, such as the basement of a building, due to the nature of the service, it requires wider coverage compared to other services provided by the 5G communication system. A UE supporting mMTC must be composed of a low-cost UE, and because it is difficult to frequently exchange the battery of the UE, a very long battery lifetime such as 10 to 15 years is required.

Lastly, in the case of URLLC, it is a cellular-based wireless communication service used for a specific purpose (mission-critical). For example, services used for remote control of a robot or machinery, industrial automation, an unmanned aerial vehicle, remote health care, an emergency alert, etc. may be considered. Therefore, the communication provided by URLLC must provide very low latency and very high reliability. For example, a service supporting URLLC must satisfy an air interface latency of less than 0.5 milliseconds and, at the same time, must satisfy the requirement of a packet error rate of $10^{-5}$ or less. Therefore, for a service supporting URLLC, the 5G communication system must provide a transmit time interval (TTI) that is smaller than that of other services, and at the same time must allocate a wide resource in a frequency band to secure the reliability of the communication link.

The three services of the 5G communication system, i.e., eMBB, URLLC, and mMTC, can be multiplexed and transmitted in one system. In this case, different transmission/reception techniques and transmission/reception parameters may be used between services to satisfy different requirements of each service.

Hereinafter, a frame structure of the 5G system will be described in more detail with reference to the drawings.

FIG. 1 is a diagram illustrating a basic structure of a time-frequency domain, which is a radio resource domain in which data or control information is transmitted in a 5G communication system.

Figure 2:
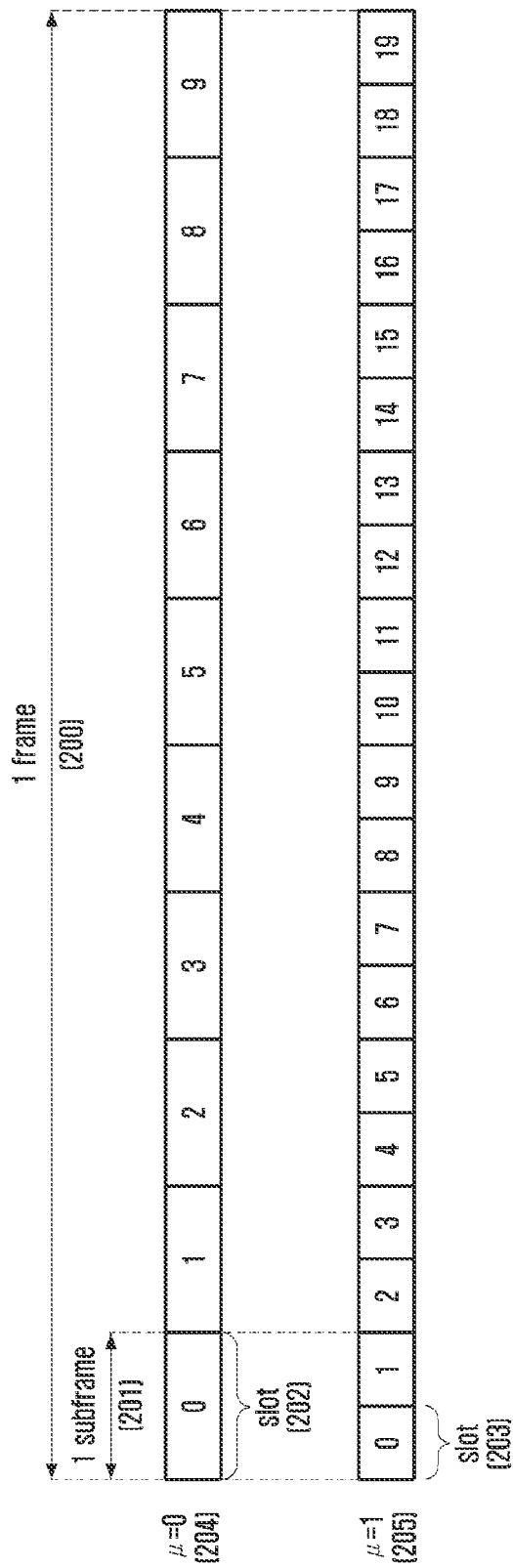
FIG. 2 is a diagram illustrating a frame, subframe, and slot structure of a 5G communication system.

According to FIG. 1, the horizontal and vertical axes represent the time domain and the frequency domain, respectively. The basic unit of resource in the time domain and frequency domain is a resource element (RE) 101, which may be defined as one orthogonal frequency division multiplexing (OFDM) symbol 102 in the time domain and may be defined as one subcarrier 103 in the frequency domain. In the frequency domain, $N_{sc}^{RB}$ (e.g., 12) consecutive REs may configure one resource block (RB) 104. FIG. 2 is a diagram illustrating a slot structure considered in a 5G communication system.

FIG. 2 illustrates an example of a structure of a frame 200, a subframe 201, and a slot 202, one frame 200 may be defined as 10 ms. One subframe 201 may be defined as 1 ms, and in this case, one frame 200 may consist of a total of 10 subframes 201. One slot 202 and 203 may be defined as 14 OFDM symbols (that is, the number of symbols per slot ($N_{symb}^{slot}$)=14). One subframe 201 may consist of one or more slots 202 and 203, and the number of slots 202 and 203 per one subframe 201 may vary according to a set value (μ) 204 and 205 for the subcarrier spacing. In the example of FIG. 2, a case where the subcarrier spacing set value μ=0 (204) and μ=1 (205) is illustrated. When μ=0 (204), one subframe 201 may consist of one slot 202, and when μ=1 (205), one subframe 201 may consist of two slots 203. That is, depending on the set value μ for the subcarrier spacing, the number of slots per one subframe ($N_{slot}^{subframe,\mu}$) may vary, and accordingly, the number of slots per one frame ($N_{slot}^{frame,\mu}$) may vary. The $N_{slot}^{subframe,\mu}$ and $N_{slot}^{frame,\mu}$ according to each subcarrier spacing set value μ may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, downlink control information (DCI) in the 5G communication system will be described in detail. In the 5G communication system, scheduling information for uplink data transmitted over a physical uplink shared channel (PUSCH) or downlink data transmitted over a physical downlink shared channel (PDSCH) is transmitted from a base station to a UE through DCI. The UE may monitor a DCI format for fallback and a DCI format for non-fallback for PUSCH or PDSCH. The DCI format for fallback may consist of a fixed field predefined between the base station and the UE, and the DCI format for non-fallback may include a configurable field.

The DCI may be transmitted through a physical downlink control channel (PDCCH) after channel coding and modulation process. A cyclic redundancy check (CRC) bit is attached to the DCI message payload, and the CRC bit is scrambled with a radio network temporary identifier (RNTI) corresponding to the identity of the UE. Different RNTIs are used according to the purpose of the DCI message, for example, UE-specific data transmission, a power control command, or a random access response. That is, the RNTI is not explicitly transmitted, but is included in the CRC calculation process and transmitted. Upon receiving the DCI message transmitted over the PDCCH, the UE identifies the CRC using the assigned RNTI, and if the CRC identification result is correct, the UE may recognize that the message has been transmitted to the UE.

For example, DCI scheduling a PDSCH for system information (SI) may be scrambled with SI-RNTI. DCI scheduling a PDSCH for a random access response (RAR) message may be scrambled with an RA-RNTI. DCI scheduling a PDSCH for a paging message may be scrambled with a P-RNTI. DCI notifying a slot format indicator (SFI) may be scrambled with an SFI-RNTI. DCI notifying a transmit power control (TPC) may be scrambled with TPC-RNTI. DCI for scheduling UE-specific PDSCH or PUSCH may be scrambled with C-RNTI (cell RNTI).

DCI format 0_0 may be used as a fallback DCI for scheduling PUSCH, and in this case, CRC may be scrambled with C-RNTI. DCI format 0_0 in which CRC is scrambled with C-RNTI may include, for example, information in Table 2 below.

TABLE 2

Identifier for DCI formats - [1] bit
Frequency domain resource
assignment -[[log$_2$(N$_{RB}^{UL, BWP}$(N$_{RB}^{UL, BWP}$ + 1)/2)]] bits
Time domain resource assignment - X bits
Frequency hopping flag - 1 bit
Modulation and coding scheme - 5 bits
New data indicator - 1 bit
Redundancy version - 2 bits
HARQ process number - 4 bits
TPC command for scheduled PUSCH - 2 bits
UL/SUL indicator - 0 or 1 bit DCI format 0_1 may be used as a non-fallback DCI for scheduling PUSCH, and in this case, CRC may be scrambled with C-RNTI. DCI format 0_1 in which CRC is scrambled with C-RNTI may include, for example, information in Table 3 below.

TABLE 3

Carrier indicator – 0 or 3 bits
UL/SUL – 0 or 1 bit
Identifier for DCI formats – [1] bits
Bandwidth part indicator – 1, 2 or 2 bits
Frequency domain resource assignment
 · For resource allocation type 0, $\lceil N_{RB}^{UL,BWP}/P \rceil$ bits
 · For resource allocation type 1, $\lceil \log_2(N_{RB}^{UL,BWP}(N_{RB}^{UL,BWP} + 1)/2) \rceil$ bits
Time domain resource assignment – 1, 2, 3, or 4 bits
VRB-to-PRB mapping – 0 or 1 bit, only resource allocation type 1
 · 0 bit if only resource allocation type 0 is configured;
 · 1 bit otherwise
Frequency hopping flag – 0 or 1 bit only for resource allocation type 1.
 · 0 bit if only resource allocation type 0 is configured;
 · 1 bit otherwise
Modulation and coding scheme – 5 bits
New data indicator – 1 bit
Redundancy version – 2 bits
HARQ process number – 4 bits
$1^{st}$ downlink assignment index – 1 or 2 bits
 · 0 bit for semi-static HARQ-ACK codebook;
 · 2 bits for dynamic HARQ-ACK codebook with single HARQ-ACK codebook.
$2^{nd}$ downlink assignment index – 0 or 2 bits
 · 2 bits for dynamic HARQ-ACK codebook with two HARQ-ACK sub-codebooks;
 · 0 bit otherwise
TPC command for scheduled PUSCH – 2 bits SRS resource indicator – $\left\lceil \log_2\left(\sum_{k=1}^{L_{max}} \binom{N_{SRS}}{k}\right) \right\rceil$ or $\lceil \log_2(N_{SRS}) \rceil$ bits · $\left\lceil \log_2\left(\sum_{k=1}^{L_{max}} \binom{N_{SRS}}{k}\right) \right\rceil$ bits for non-codebook based PUSCH transmission;

· $\lceil \log_2(N_{SRS}) \rceil$ bits for codebook based PUSCH transmission.
Precoding information and number of layers – up to 6 bits
Antenna ports – up to 5 bits
SRS request – 2 bits
CSI request – 0, 1, 2, 3, 4, 5, or 6 bits
CBG transmission information – 0, 2, 4, 6, or 8 bits
PTRS-DMRS association – 0 or 2 bits
beta offset indicator – 0 or 2 vits
DMRS sequence initialization – 0 or 1 bit DCI format 1_0 may be used as a fallback DCI for scheduling PDSCH, and in this case, CRC may be scrambled with C-RNTI. DCI format 1_0 in which CRC is scrambled with C-RNTI may include, for example, information in Table 4 below.

TABLE 4

Indicator for DCI formats - [1] bit
Frequency domain resource assignment -$[\lceil \log_2(N_{RB}^{UL, BWP}(N_{RB}^{UL, BWP} + 1)/2) \rceil]$ bits
Time domain resource assignment - X bits
VRB-to-PRB mapping - 1 bit
Modulation and coding scheme - 5 bits
New data indicator - 1 bit
Redundancy version - 2 bits
HARQ process number - 4 bits
Down link assignment index - 2 bits
TPC command for scheduled PUSCH - [2] bits
PUCCH resource indicator - 3 bits
PDSCH-to-HARQ feedback timing indicator - [3] bits DCI format 1_1 may be used as a non-fallback DCI for scheduling PDSCH, and in this case, CRC may be scrambled with C-RNTI. DCI format 1_1 in which CRC is scrambled with C-RNTI may include, for example, information in Table 5 below.

TABLE 5

Carrier indicator - 0 or 3 bits
Identifier for DCI formats - [1] bits
Bandwidth part indicator - 0, 1, or 2 bits
Frequency domain resource assignment
For resource allocation type 0, $\lceil N_{RB}^{UL, BWP}/P \rceil$ bits
For resource allocation type 1, $\lceil \log_2(N_{RB}^{UL, BWP}(N_{RB}^{UL, BWP} + 1)/2) \rceil$ bits
Time domain resource assignment - 1, 2, 3, or 4 bits
VRB-to-PRB mapping - 0 or 1 bit, only for resource allocation type 1
0 bit if only resource allocation type 0 is configured;
1 bit otherwise
PRB bundling size indicator - 0 or 1 bit
Rate matching indicator - 0, 1, or 2 bits
ZP CSI-RS trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUSCH - 2 bits
PUCCH resource indicator - 3 bits
PDSCH-to-HARQ feedback timing indicator - 3 bits
Antenna ports - 4, 5, or 6 bits
Transmission configuration indication - 0 or 3 bits
SRS request - 2 bits
CBG transmission information - 0, 2, 4, 6, or 8 bits
CGB flushing out information - 0 or 1 bit
DMRS sequence initialization - 1 bit Hereinafter, a configuration method for the bandwidth part considered in the 5G communication system will be described.

Figure 3:
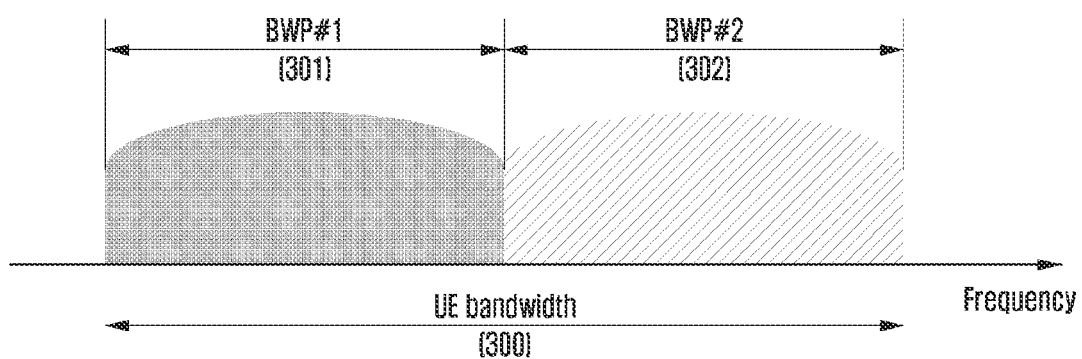
FIG. 3 is a diagram illustrating an example of configurating a bandwidth part of a 5G communication system.

FIG. 3 is a diagram illustrating an example of configuring a bandwidth part of a 5G communication system. FIG. 3 illustrates an example in which the UE bandwidth 300 is configured to two bandwidth parts, namely, BWP #1 (301) and BWP #2 (302). The base station may configure one or more bandwidth parts to the UE, and may configure information as illustrated in [Table 6] below for each bandwidth part.

TABLE 6

| | |
|---|---|
| BWP ::= | SEQUENCE { |
| > bwp-Id | BWP-Id, |
| (bandwidth part identifier) | |
| > locationAndBandwidth | INTEGER (1..65536), |
| (bandwidth part location) | |
| > subcarrierSpacing | ENUMERATED{n0,n1,n2,n3,n4,n5}, |
| (subcarrier spacing) | |
| > cyclicPrefix | ENUMERATED{extended} (cyclic |
| prefix) | |
| } | |

Various parameters related to bandwidth part may be configured in the UE in addition to the above-described configuration information. The above-described information may be transmitted by the base station to the UE through higher layer signaling, for example, RRC (radio resource control) signaling (this can be used interchangeably with higher signaling and higher layer signaling). At least one bandwidth part among one or more configured bandwidth parts may be activated. Information on whether the configured bandwidth part is activated may be semi-statically transmitted from the base station to the UE through RRC signaling, or may be dynamically transmitted through medium access control (MAC), control element (CE), or DCI.

The configuration of the bandwidth part supported by the 5G communication system may be used for various purposes.

For example, when the bandwidth supported by the UE is smaller than the system bandwidth, it can be supported through the bandwidth part configuration. For example, in [Table 6], the frequency position of the bandwidth part (configuration information 2) is configured for the UE, so that the UE may transmit and receive data at a specific frequency position within the system bandwidth.

As another example, for the purpose of supporting different numerologies, the base station may configure a plurality of bandwidth parts for the UE. For example, to support both data transmission and reception using a subcarrier spacing of 15 kHz and a subcarrier spacing of 30 kHz to an arbitrary UE, two bandwidth parts may be configured to use a subcarrier spacing of 15 kHz and 30 kHz, respectively. Different bandwidth parts may be frequency division multiplexed (FDM), and when data is transmitted/received with a specific subcarrier space, a bandwidth part configured for the corresponding subcarrier space may be activated.

As another example, for the purpose of reducing power consumption of the UE, the base station may configure bandwidth parts having different bandwidths to the UE. For example, when the UE supports a very large bandwidth, for example, a bandwidth of 100 MHz and always transmits and receives data using the corresponding bandwidth, very large power consumption may be caused. Particularly, it is very inefficient in terms of power consumption for the UE to monitor the downlink control channel for an unnecessarily large bandwidth of 100 MHz in a situation in which there is no traffic. For reducing power consumption of the UE, the base station may configure a relatively small bandwidth part for the UE, for example, a bandwidth part of 20 MHz. In the absence of traffic, the UE may monitor in a bandwidth part of 20 MHz, and when data are generated, the UE may transmit/receive data using the bandwidth part of 100 MHz according to the instruction of the base station.

In the method of configurating the bandwidth part, the UEs before the RRC connection may receive the configuration information for the initial bandwidth part through the master information block (MIB) in the initial access step. More specifically, the UE may receive from the MIB of the physical broadcast channel (PBCH), a control area (control resource set (CORESET)) for a downlink control channel through which downlink control information (DCI) scheduling system information block (SIB) may be transmitted. The bandwidth of the control area configured as the MIB may be regarded as an initial bandwidth part, and through the configured initial bandwidth part, the UE may receive a physical downlink shared channel (PDSCH) through which the SIB is transmitted. In addition to the purpose of receiving the SIB, the initial bandwidth part may be utilized for other system information (OSI), paging, and random access.

Hereinafter, a downlink control channel in a 5G communication system will be described in more detail with reference to the drawings.

Figure 4:
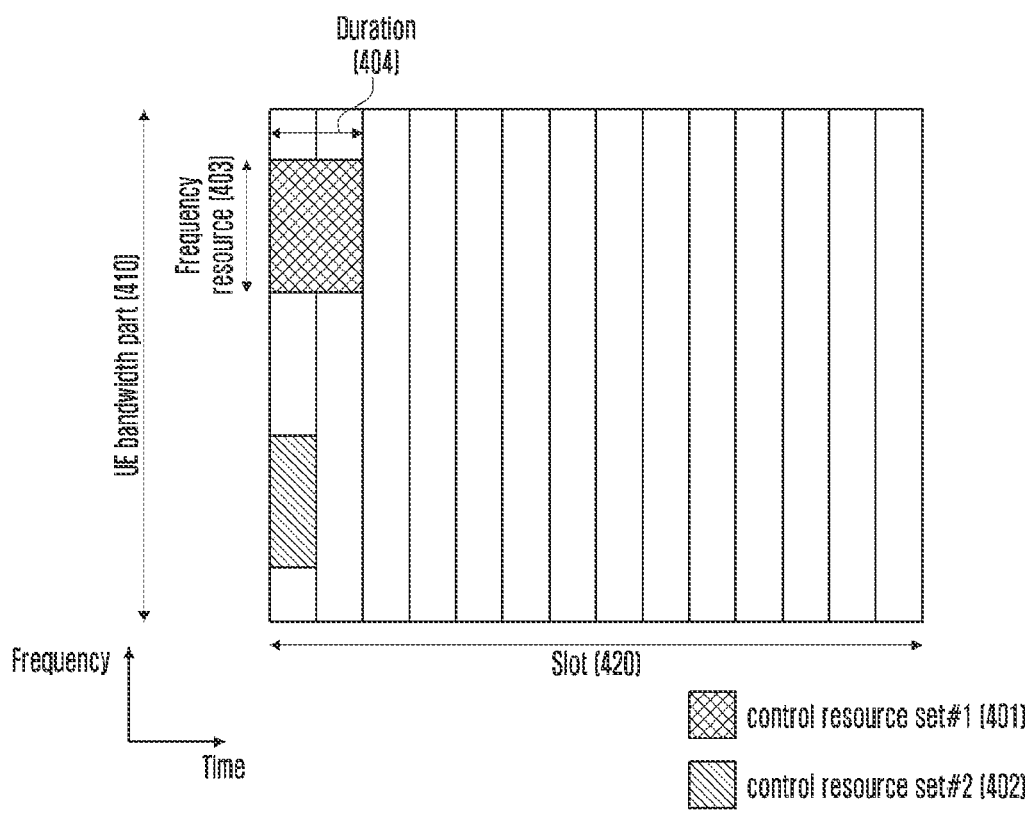
FIG. 4 is a diagram illustrating an example of configurating a control area of a downlink control channel of a 5G communication system.

FIG. 4 is a diagram illustrating an example of a control area (CORESET) in which a downlink control channel is transmitted in a 5G communication system. FIG. 4 illustrates an example in which a UE bandwidth part 410 is configure on the frequency axis and two control areas (control resource set #1 (401) and control resource set #2 (402)) are configured in one slot (420) on the time axis. The control areas 401 and 402 may be configured to a specific frequency resource 403 within the entire UE bandwidth part 410 on the frequency domain. One or a plurality of OFDM symbols may be configured on the time domain, and this may be defined as Control Resource Set Duration 404. Referring to the example illustrated in FIG. 4, control resource set #1 (401) may be configured to a control resource set length of 2 symbols, and control resource set #2 (402) may be configured to a control resource set length of 1 symbol. The control resource set in the above-described 5G system may be configured by the base station to the UE through higher layer signaling (e.g., system information, Master Information Block (MIB), Radio Resource Control (RRC) signaling). For example, the information in Table 7 below may be provided.

TABLE 7

```
ControlResourceSet ::=                    SEQUENCE{
    Corresponds to L1 parameter 'CORESET-ID'
    controlResourceSetId              ControlResourceSetId,
(control resource set identity)
    frequencyDomainResources          BIT STRING(SIZE(45)),
(frequency domain resource allocation information)
    duration                          INTEGER
    (1..maxCoReSetDuration),
(time domain resource allocation information)
    cce-REG-MappingType               CHOICE {
(CCE-to-REG mapping type)
        interleaved
            SEQUENCE {
                reg-BundleSize
                ENUMERATED {n2, n3, n6},
                (REG bundle size)
                precoderGranularity
                ENUMERATED           {sameAsREG-bundle,
                allContiguousRBs},
                interleaverSize
                ENUMERATED {n2, n3, n6}
                (interleaverSize)
                    shiftIndex
                        INTEGER(0..maxNrofPhysicalResourceBloc
                    ks-1)
                    OPTIONAL
                    (interleaver shift))
            },
            nonInterleaved            NULL
        },
        tci-StatesPDCCH
        SEQUENCE(SIZE (1..maxNrofTCI-StatesPDCCH)) OF TCI-
        StateId OPTIONAL,
(QCL configuration information)
        tci-PresentInDCI              ENUMERATED {enabled}
        OPTIONAL, -- Need S
}
```

Figure 5:
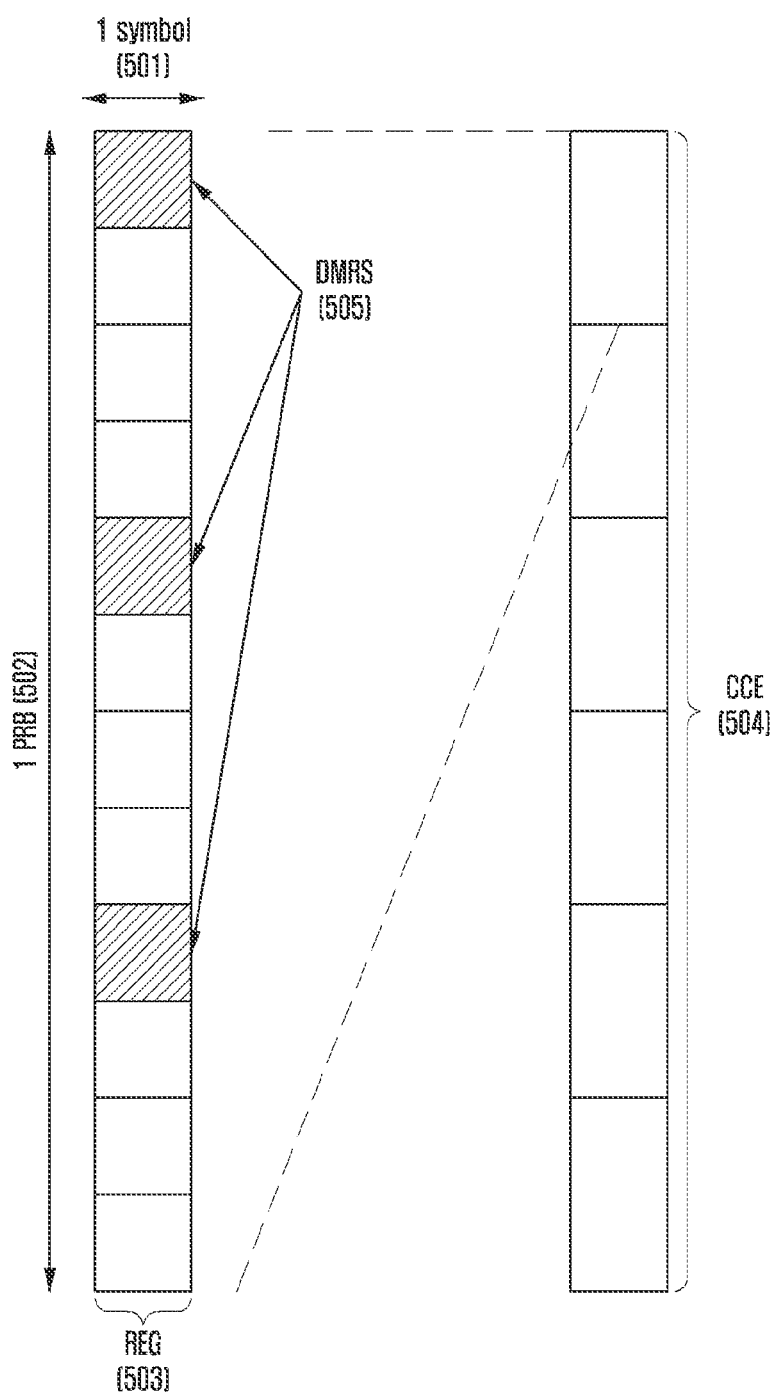
FIG. 5 is a diagram illustrating an example of a structure of a downlink control channel of a 5G communication system.

FIG. 5 illustrates an example of a basic unit of time and frequency resources constituting a downlink control channel that can be used in a 5G communication system. According to FIG. 5, the basic unit of time and frequency resources constituting the control channel is called a resource element group REG) 503, and the REG 503 has 1 OFDM symbol 501 on the time axis and 1 PRB (physical resource block, 502), which may be defined as 12 subcarriers on the frequency axis. A downlink control channel allocation unit may be configured by concatenating the REG 503. Describing the REG 503 illustrating in FIG. 5 as an example, the REG 503 may be composed of 12 REs, and if 1 CCE 504 is composed of 6 REGs 503, 1 CCE 504 may be composed of 72 REs. When the downlink control area is configured, the corresponding area may be composed of a plurality of CCEs 504, and a specific downlink control channel is mapped to one or more CCEs 504 according to the aggregation level (AL) in the control area and transmitted. CCEs 504 in the control area are divided by numbers, and in this case, numbers may be assigned according to a logical mapping method.

The basic unit of the downlink control channel, i.e., REG 503 illustrated in FIG. 5, may include both REs to which DCI is mapped and areas to which a demodulation reference signal (DMRS), which is a reference signal (RS) for decoding REs, is mapped. As in FIG. 5, 3 DMRSs 505 may be transmitted within one REG 503.

The number of CCEs required to transmit the PDCCH may be 1, 2, 4, 8, or 16 depending on the aggregation level (AL), and different numbers of CCEs may be used to implement link adaptation of the downlink control channel. For example, when AL=L, one downlink control channel may be transmitted through L CCEs. The UE needs to detect a signal without figuring out information about the downlink control channel. For blind decoding, a search space indicating a set of CCEs is defined. Because the search space is a set of downlink control channel candidates consisting of CCEs that the UE should attempt to decode on a given aggregation level, and there are several aggregation levels that make one bundle with 1, 2, 4, 8 or 16 CCEs, the UE may have a plurality of search spaces. The search space set may be defined as a set of search spaces in all set aggregation levels.

The search space may be classified into a common search space and a UE-specific search space. A group of UEs or all UEs may search the common search space of the PDCCH to receive cell-common control information such as dynamic scheduling for system information or a paging message. For example, the UE may receive the PDSCH scheduling allocation information for transmission of the SIB including the operator information of the cell by examining the common search space of the PDCCH. In the case of the common search space, because a certain group of UEs or all UEs must receive the PDCCH, it may be defined as a set of promised CCEs. The UE-specific scheduling assignment information for the PDSCH or PUSCH may be received by examining the UE-specific search space of the PDCCH. The UE-specific search space may be UE-specifically defined as a function of the UE's identity and various system parameters.

In the 5G system, the parameter for the search space for the PDCCH may be configured from the base station to the UE through higher layer signaling (e.g., SIB, MIB, and RRC signaling). For example, the base station may configure the number of PDCCH candidates in each aggregation level L, a monitoring period for the search space, a monitoring occasion in symbol units in a slot for a search space, a search space type (common search space or UE-specific search space), a combination of a DCI format and RNTI to be monitored in the corresponding search space, a control resource set index for monitoring the search space, and the like to the UE. For example, the information in Table 8 below may be configured.

TABLE 8

```
SearchSpace ::=                              SEQUENCE {
    Identity of the search space. SearchSpaceId = 0 identifies the
    SearchSpace configured via PBCH (MIB) or
    ServingCellConfigCommon.
searchSpaceId                                SearchSpaceId,
(search space identity)
controlResourceSetId                         ControlResourceSetId,
(control resource set identity)
```

TABLE 8-continued

```
monitoringSlotPeriodicityAndOffset           CHOICE {
(monitoring slot level periodicity)
sl1
    NULL,
sl2
    INTEGER (0..1),
sl4
    INTEGER (0..3),
sl5
    INTEGER (0..4),
sl8
    INTEGER (0..7),
sl10
    INTEGER (0..9),
sl16
    INTEGER (0..15),
sl20
    INTEGER (0..19)
}
    OPTIONAL,
    Indicates whether the UE monitors in this USS for DCI
    formats 0-0 and 1-0 or for formats 0-1 and 1-1.
formats
ENUMERATED {formats0-0-And-1-0, formats0-1-And-1-1},
    ...
}
```

According to the configuration information, the base station may configure one or a plurality of search space sets to the UE. As an example, the base station may configure the search space set 1 and the search space set 2 to the UE. In search space set 1, the UE may be configured to monitor DCI format A scrambled with X-RNTI in a common search space, and in search space set 2, the UE may be configured to monitor DCI format B scrambled with Y-RNTI in the UE-specific search space.

According to the configuration information, one or a plurality of search space sets may exist in the common search space or the UE-specific search space. For example, the search space set #1 and the search space set #2 may be configured as the common search space, and the search space set #3 and the search space set #4 may be configured as the UE-specific search space.

In the common search space, a combination of the following DCI format and RNTI may be monitored.
  DCI format 0_0/1_0 with CRC scrambled by C-RNTI, CS-RNTI, SP-CSI-RNTI, RA-RNTI, TC-RNTI, P-RNTI, SI-RNTI
  DC format 2_0 with CRC scrambled by SFI-RNTI
  DCI format 2_1 with CRC scrambled by INT-RNTI
  DCI format 2_2 with CRC scrambled by TPC-PUSCH-RNTI, TPC-PUCCH-RNTI
  DC format 2_3 with CRC scrambled by TPC-SRS-RNTI
    In the UE-specific search space, a combination of the following DCI format and RNTI may be monitored.
  DCI format 0_0/1_0 with CRC scrambled by C-RNTI, CS-RNTI, TC-RNTI
  DCI format 1_0/1_1 with CRC scrambled by C-RNTI, CS-RNTI, TC-RNTI The specified RNTIs may follow the definitions and uses below.

C-RNTI (Cell RNTI): UE-specific PDSCH scheduling purpose

TC-RNTI (Temporary Cell RNTI): UE-specific PDSCH scheduling purpose

CS-RNTI (Configured Scheduling RNTI): Semi-statically configured UE-specific PDSCH scheduling purpose RA-RNTI (Random Access RNTI): PDSCH scheduling purpose in the random access phase P-RNTI (Paging RNTI): PDSCH scheduling purpose for which paging is transmitted SI-RNTI (System Information RNTI): PDSCH scheduling purpose in which system information is transmitted INT-RNTI (Interruption RNTI): Used to indicate whether PDSCH is puncturing TPC-PUSCH-RNTI (Transmit Power Control for PUSCH RNTI): Used to indicate power control command for PUSCH TPC-PUCCH-RNTI (Transmit Power Control for PUCCH RNTI): Used to indicate power control command for PUCCH TPC-SRS-RNTI (Transmit Power Control for SRS RNTI): Used to indicate power control command for SRS The above specified DCI formats may follow the definition below in Table 9.

TABLE 9

| DCI format | Purpose |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G system, the search space of the aggregation level L in the control area p and the search space set s may be expressed by the following equation. [Equation 1]

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p} / L \rfloor \right\} + i \quad \text{[Equation 1]}$$

L: Aggregation level $n_{CI}$: carrier index $N_{CCE,p}$: the total number of CCEs present in the control area p $n_{s,f}^\mu$: slot index $M_{p,s,max}^{(L)}$: the number of PDCCH candidates of aggregation level L $m_{s,n_{CI}}=0, \ldots, M_{p,s,max}^{(L)}-1$: PDCCH candidate index of aggregation level L i=0, . . . , L-1

$Y_{p,n_{s,f}^\mu} = (A_p \cdot Y_{p,n_{s,f}^\mu -1}) \bmod D$, $Y_{p,-1}=n_{RNTI} \neq 0$, A0=39827, A1=39829, A2=39839, D=6553

$n_{RNTI}$: UE identity

The $Y\_(p,n_{s,f}^\mu)$ value may correspond to 0 in the case of a common search space.

The $Y\_(p,n_{s,f}^\mu)$ value may correspond to a value that changes depending on the UE's identity (C-RNTI or ID configured for the UE by the base station) and the time index in the UE-specific search space.

Hereinafter, a physical uplink control channel (PUCCH) in a 5G communication system will be described in more detail with reference to the drawings.

Figure 6:
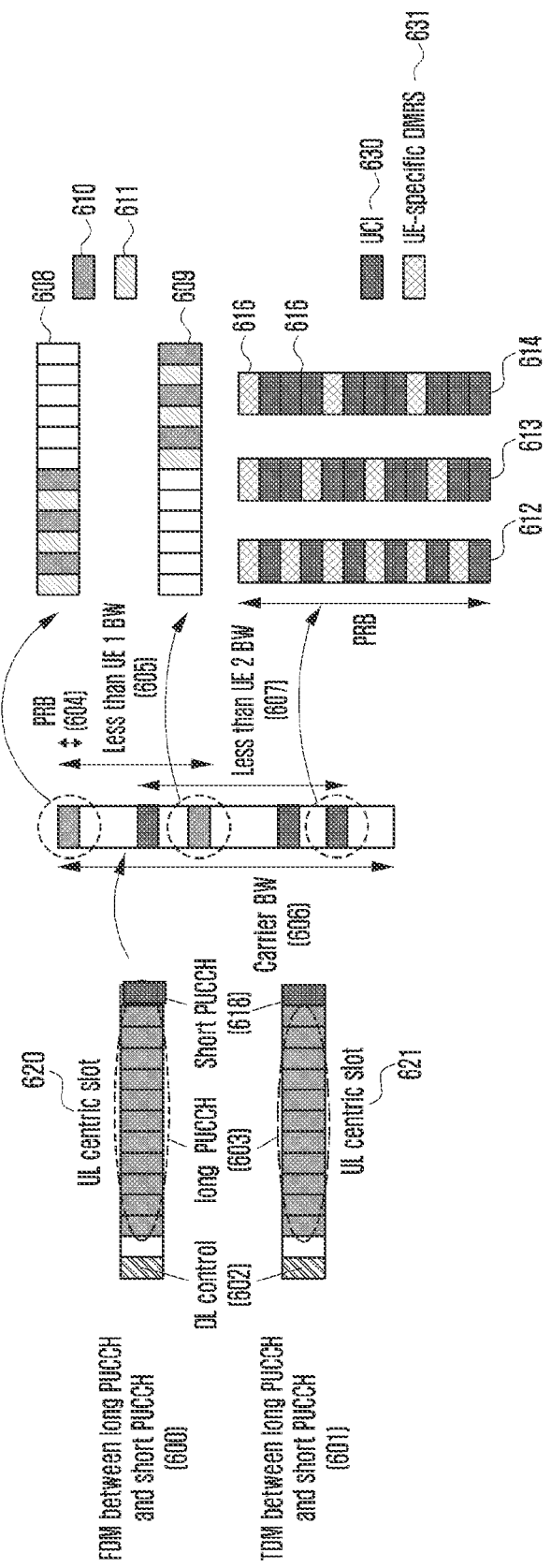
FIG. 6 is a diagram illustrating an example of the structure of an uplink control channel of a 5G communication system.

FIG. 6 is a diagram illustrating the structure of an uplink control channel of a 5G communication system.

In FIG. 6, the Long PUCCH and the Short PUCCH are multiplexed in the frequency domain (FDM, 600) or in the time domain (time domain multiplexing, TDM, 601). First, a slot structure in which the long PUCCH 603 and the short PUCCH 618 are multiplexed in FIG. 6 will be described. 620 and 621 illustrate UL centric slots in which uplink is mainly used in a slot (This may be referred to by various names, such as a subframe or a transmission time interval (TTI). In the disclosure, the basic transmission unit is called a slot) that is a basic transmission unit of a 5G communication system. In the uplink centric slot, the number of OFDM symbols used for uplink is the majority, and it is possible that all OFDM symbols are used for uplink transmission, or it is also possible that several OFDM symbols above are used for downlink transmission, and when the downlink and the uplink simultaneously exist in one slot, a transmission gap may exist between the two. In FIG. 6, the first OFDM symbol in one slot is used for downlink transmission, for example, downlink control channel transmission 602, and the third OFDM symbol is used for uplink transmission. The second OFDM symbol is used as a transmission gap. In uplink transmission, uplink data channel transmission and uplink control channel transmission are possible. Next, the long PUCCH 603 will be described. Because the control channel with a long transmission period is used for the purpose of increasing cell coverage, the control channel with a long transmission period may be transmitted using a discrete Fourier transform-spread-OFDM (DFT-S-OFDM) scheme, which is a short-carrier transmission rather than OFDM transmission. Accordingly, in this case, transmission should be performed using only continuous subcarriers, and to obtain a frequency diversity effect, an uplink control channel with a long transmission interval is configured at positions 608 and 609 apart from each other. In terms of frequency, the distance 605 should be smaller than the bandwidth supported by the UE, and transmit using PRB-1 as in 608 in the front part of the slot, and transmit using PRB-2 as in 609 in the rear part of the slot. Therefore, the frequency-side distance between PRB-1 and PRB-2 should be smaller than the maximum supported bandwidth of the UE, and the maximum supported bandwidth of the UE may be equal to or smaller than the bandwidth 606 supported by the system. The frequency resources PRB-1 and PRB-2 may be configured to the UE by higher signaling, and a frequency resource configured by higher signaling is mapped to a bit field, and which frequency resource is to be used may be indicated to the UE by a bit field included in the downlink control channel. In addition, the control channel transmitted in the front part of the slot of 608 and the control channel transmitted in the rear part of the slot of 609 are composed of uplink control information (UCI) of 610 and a UE reference signal 611, respectively, and it is assumed that the two signals are time-separated and transmitted in different OFDM symbols.

In the Long PUCCH 603, transmission formats such as PUCCH format 1, PUCCH format 3, and PUCCH format 4 are supported depending on the number of supportable control information bits and whether UE multiplexing is supported through Pre-DFT OCC support in the front end of the inverse fast Fourier transform (IFFT). First, PUCCH format 1 is a DFT-S-OFDM-based long PUCCH format capable of supporting up to 2 bits of control information. The control information may be composed of a combination or each of HARQ-ACK and scheduling request (SR).

In PUCCH format 1, an OFDM symbol including DMRS as a demodulation reference signal and an OFDM symbol including uplink control information (UCI) are repeatedly configured. For example, if the number of transmission symbols in PUCCH format 1 is 8, the DMRS symbol, UCI symbol, DMRS symbol, UCI symbol, DMRS symbol, UCI symbol, DMRS symbol, and UCI symbol are sequentially configured from the first start symbol of 8 symbols. The DMRS symbol is spread using an orthogonal code (or orthogonal sequence or spreading sign, $w_i(m)$) on a time axis in a sequence corresponding to a length of 1 RB on a frequency axis in one OFDM symbol, and is transmitted after IFFT is performed. For the UCI symbol, BPSK modulation is performed on 1-bit control information and QPSK modulation is performed on 2-bit control information to generate d(0), and the generated d(0) is scrambled by multiplying it by a sequence corresponding to the length of 1 RB on the frequency axis, and the scrambled sequence is spread using an orthogonal code (or orthogonal sequence or spreading sign, $w_i(m)$) on the time axis, and is transmitted after IFFT is performed. The UE generates a sequence based on the group hopping or sequence hopping configuration and the configured ID set by the higher signaling from the base station, and generates a sequence corresponding to a length of 1 RB by cyclic shifting the generated sequence with the indicated initial cyclic shift (CS) value.

$w_i(m)$ is given as follows according to the length (NSF) of the spreading code. i means the index of the spreading code itself, and m means the index of elements of the spreading code. Here, the numbers in [ ] n the table mean $\phi(m)$, for example, when the length of the spreading code is 2, the spreading code $w_i(m)$ becomes $w_i(0)=e^{j2z \cdot 0/N_{SF}}$, $w_i(1)=e^{j2z \cdot 0/N_{SF}}$ so that w_i(m)=[1 1].

TABLE 10

SPREAD SIGN PUCCH format 1 $w_i(m) = e^{j2\pi\phi(m)/N_{SF}}$

| $N_{SF}$ | i = 0 | i = 1 | i = 2 | i = 3 | i = 4 | i = 5 | i = 6 |
|---|---|---|---|---|---|---|---|
| 2 | [00] | [01] | — | — | — | — | — |
| 3 | [000] | [012] | [021] | — | — | — | — |
| 4 | [0000] | [0202] | [0022] | [0220] | — | — | — |
| 5 | [00000] | [01234] | [02413] | [03142] | [04321] | — | — |
| 6 | [000000] | [012345] | [024024] | [030303] | [042042] | [054321] | — |
| 7 | [0000000] | [0123456] | [0246135] | ]0362514] | [0415263] | [0531642] | [0654321] |

Next, PUCCH format 3 is a long PUCCH format based on DFT-S-OFDM that can support more than 2 bits of control information. The control information may consist of a combination or each of HARQ-ACK, CSI (channel state information), and SR. In PUCCH format 3, DMRS symbol positions are presented in the following table according to whether frequency hopping is performed and whether additional DMRS symbols are configured.

TABLE 11

| | DMRS position in PUCCH format 3/4 transmission | | | |
|---|---|---|---|---|
| | No additional DMRS configuration | | Additional DMRS configuration | |
| PUCCH format 3/4 transmission length | No frequency hopping configuration | Frequency hopping configuration | No frequency hopping configuration | Frequency hopping configuration |
| 4 | 1 | 0, 2 | 1 | 0, 2 |
| 5 | | 0, 3 | | 0, 3 |
| 6 | | 1, 4 | | 1, 4 |
| 7 | | 1, 4 | | 1, 4 |
| 8 | | 1, 5 | | 1, 5 |
| 9 | | 1, 6 | | 1, 6 |
| 10 | | 2, 7 | | 1, 3, 6, 8 |
| 11 | | 2, 7 | | 1, 3, 6, 9 |

TABLE 11-continued

| | DMRS position in PUCCH format 3/4 transmission | | | |
|---|---|---|---|---|
| | No additional DMRS configuration | | Additional DMRS configuration | |
| PUCCH format 3/4 transmission length | No frequency hopping configuration | Frequency hopping configuration | No frequency hopping configuration | Frequency hopping configuration |
| 12 | | 2, 8 | | 1, 4, 7, 10 |
| 13 | | 2, 9 | | 1, 4, 7, 11 |
| 14 | | 3, 10 | | 1, 5, 8, 12 |

For example, when the number of transmission symbols of PUCCH format 3 is 8, the DMRS is transmitted to the first symbol and the fifth symbol by starting the first start symbol of the 8 symbols with 0. The above table is also applied to the DMRS symbol position of PUCCH format 4 in the same manner.

Next, PUCCH format 4 is a long PUCCH format based on DFT-S-OFDM that can support more than 2 bits of control information. The control information may consist of a combination or each of HARQ-ACK, CSI, and SR. The difference between PUCCH format 4 and PUCCH format 3 is that in the case of PUCCH format 4, PUCCH format 4 of multiple UEs can be multiplexed within one RB. It is possible to multiplex PUCCH format 4 of a plurality of UEs by applying Pre-DFT OCC to control information at the front end of the IFFT. However, the number of transmittable control information symbols of one UE is reduced according to the number of multiplexed UEs.

Next, the short PUCCH 618 will be described. The Short PUCCH may be transmitted in both the downlink centric slot and the uplink centric slot, and is generally transmitted in the last symbol of the slot or an OFDM symbol at the rear (e.g., the last OFDM symbol or the second-to-last OFDM symbol, or the last 2 OFDM symbols). Of course, it is also possible to transmit the Short PUCCH at any position within the slot. In addition, the Short PUCCH may be transmitted using one OFDM symbol, two OFDM symbols, or a plurality of OFDM symbols. In FIG. 6, the Short PUCCH is transmitted in the last symbol 618 of the slot. Radio resources for the Short PUCCH are allocated in units of PRBs on the frequency side, and as the allocated PRBs, one PRB or a plurality of consecutive PRBs may be allocated, or a plurality of PRBs separated from a frequency band may be allocated. In addition, the allocated PRB must be included in a band equal to or smaller than the frequency band 607 supported by the UE. A plurality of PRBs, which are the allocated frequency resources, may be configured to the UE by higher signaling, and the frequency resource configured by the higher signal is mapped to a bit field, and which frequency resource to be used may be indicated to the UE by a bit field included in the downlink control channel.

In addition, in one PRB, the uplink control information 630 and the demodulation reference signal 631 must be multiplexed in the frequency band, there may be a method of transmitting a demodulation reference signal in one symbol every two symbols as in 612, a method of transmitting a demodulation reference signal in one symbol for every three symbols as in 613, or a method of transmitting a demodulation reference signal in one symbol for every four symbols as in 614. As for the demodulation signal transmission methods such as 612, 613, and 614, which method to use may be configured by higher signaling. Alternatively, one of the mapping schemes is defined in the standard, so that the UE transmits a short PUCCH according to the mapping scheme, and the base station can demodulate the short PUCCH according to the mapping scheme. Alternatively, the UE multiplexes the demodulation reference signal and the uplink control information according to a method indicated through reception of higher signaling and transmits the multiplex. Alternatively, a method of transmitting the demodulation reference signal may be determined according to the number of bits of the uplink control information 620. For example, when the number of bits of uplink control information is small, the UE may transmit the PUCCH by multiplexing the demodulation reference signal and the uplink control information in the same manner as in 612. When the number of bits of uplink control information is small, a sufficient transmission code rate can be obtained even if many resources are not used for transmission of uplink control information. For example, when the number of bits of uplink control information is large, the UE may transmit the PUCCH by multiplexing the demodulation reference signal and the uplink control information in the same manner as in 614. When the number of bits of uplink control information is large, it may be necessary to use a large number of resources for transmission of uplink control information in order to lower a transmission code rate.

The Short PUCCH 618 supports transmission formats such as PUCCH format 0 and PUCCH format 2 according to the number of supportable control information bits. First, PUCCH format 0 is a CP-OFDM-based short PUCCH format capable of supporting up to 2 bits of control information. The control information may be composed of a combination or each of HARQ-ACK and SR. PUCCH format 0 has a structure in which only a sequence mapped to 12 subcarriers is transmitted on the frequency axis within one OFDM symbol without transmitting DMRS. The UE generates a sequence based on the group hopping or sequence hopping configuration and the configured ID configured by the higher signaling from the base station, and cyclically shifts the generated sequence with the final CS value obtained by adding a different CS value depending on whether the indicated initial CS value is ACK or NACK, maps it to 12 subcarriers, and transmits it. For example, when HARQ-ACK is 1 bit, as in the following table, if ACK, 6 is added to the initial CS value to generate a final CS, and if NACK, 0 is added to the initial CS to generate a final CS. The CS value 0 for NACK and 6 CS value for ACK are defined in the standard, and the UE always generates PUCCH format 0 according to the value and transmits 1-bit HARQ-ACK.

TABLE 12

| 1-bit HARQ-ACK | NACK | ACK |
| --- | --- | --- |
| final CS | (initial CS + 0) mod 12 = initial CS | (initial CS + 6) mod 12 |

For example, when HARQ-ACK is 2 bits, as in the following table, if (NACK, NACK), 0 is added to the initial CS value, if (NACK, ACK), 3 is added to the initial CS value, if (ACK, ACK), 6 is added to the initial CS value, and if (ACK, NACK), 9 is added to the initial CS value. A CS value of 0 for (NACK, NACK), a CS value of 3 for (NACK, ACK), a CS value of 6 for (ACK, ACK), and a CS value of 9 for (ACK, NACK) are defined in the standard, and the UE always generates PUCCH format 0 according to the above value and transmits a 2-bit HARQ-ACK, if the final CS value exceeds 12 by the CS value added according to ACK or NACK to the initial CS value, because the length of the sequence is 12, it is obvious to apply modulo 12.

TABLE 13

| 2-bit HARQ-ACK | NACK, NACK | NACK, ACK | ACK, ACK | ACK, NACK |
| --- | --- | --- | --- | --- |
| final CS | (initial CS + 0) mod 12 = initial CS | (initial CS + 3) mod 12 | (initial CS + 6) mod 12 | (initial CS + 9) mod 12 |

Next, PUCCH format 2 is a CP-OFDM-based short PUCCH format capable of supporting more than 2 bits of control information. The control information may consist of a combination or each of HARQ-ACK, CSI, and SR. When the position of the subcarrier on which the DMRS is transmitted within one OFDM symbol is 612, the index of the first subcarrier is #0, PUCCH format 2 is fixed to subcarriers having indices of #1, #4, #7, and #10. The control information is mapped to the remaining subcarriers except for the subcarrier in which the DMRS is located through a modulation process after channel encoding. In the disclosure, when referred to as short PUCCH, unless otherwise specified, PUCCH format 0 or PUCCH format 2 is referred to, and when referred to as long PUCCH, PUCCH format 1 or PUCCH format 3 or PUCCH format 4 is referred to when not specifically specified. In addition, in the disclosure, transmission in PUCCH format X means transmission using a PUCCH resource for PUCCH format X obtained through the method of the disclosure, such as directed or derived from a base station, unless otherwise specified.

According to various embodiments of the disclosure, data or control information may be transmitted in a plurality of base stations or a plurality of TRPs (transmission reception point) to a UE using a downlink channel, and in response, the UE may transmit data or control information using an uplink channel.

Figure 7:
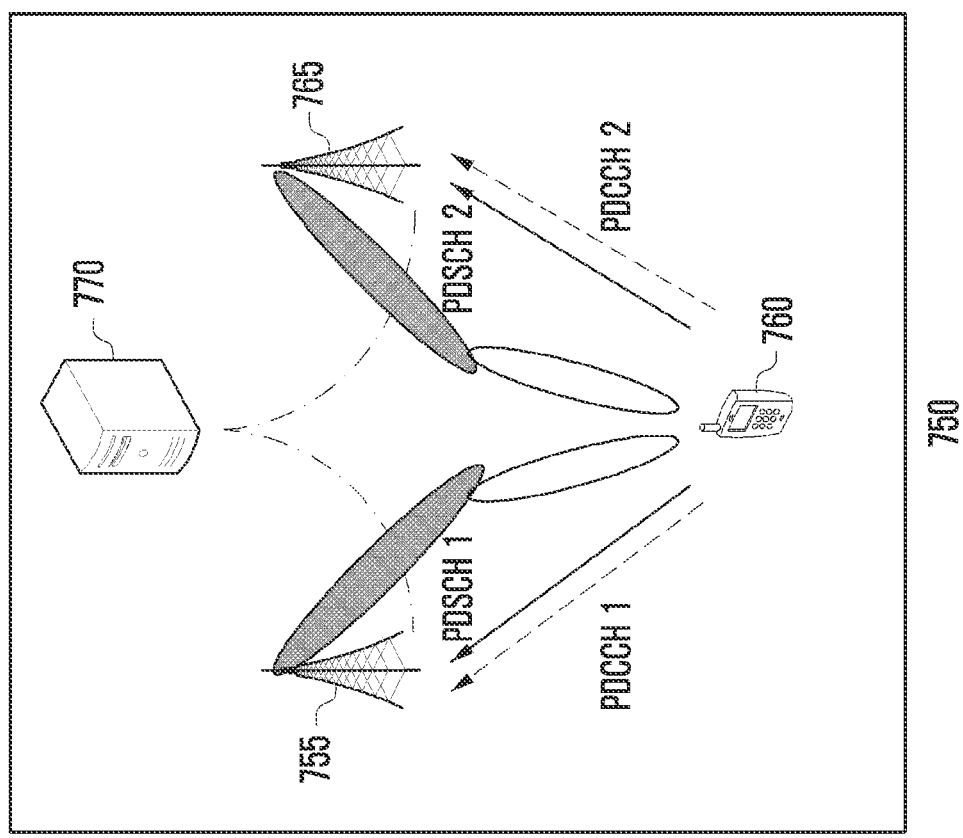
FIG. 7 is a diagram illustrating an example of transmission/reception operations between a plurality of base stations and a UE according to the disclosure.
Figure 7:
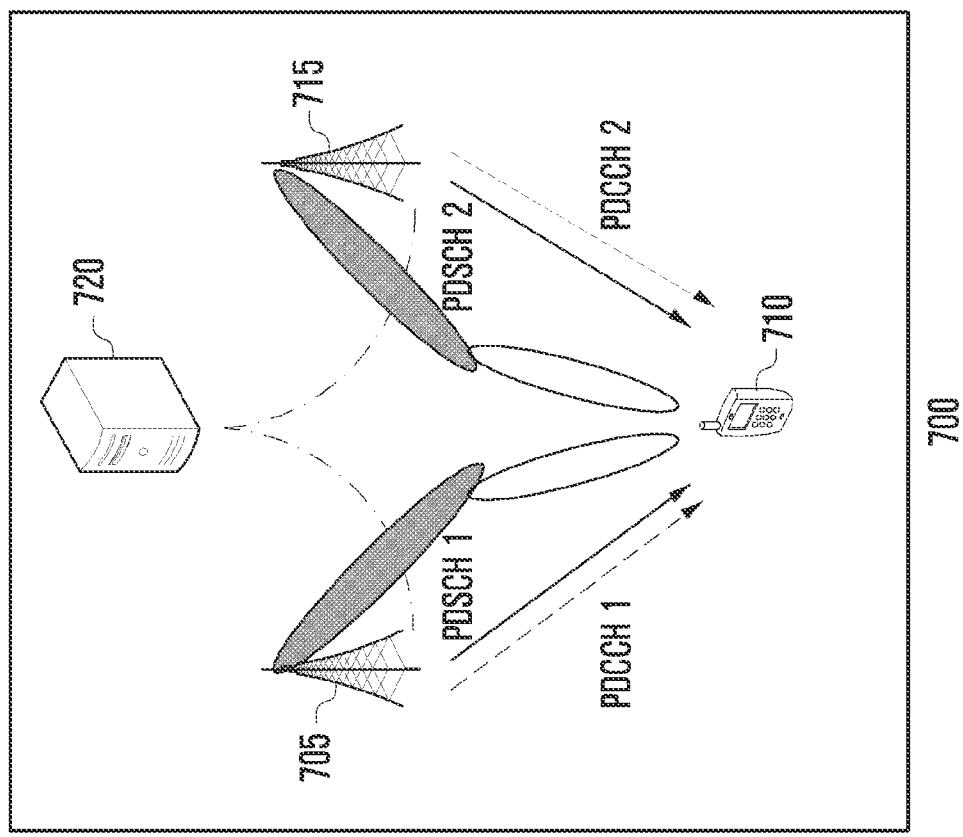

FIG. 7 is a diagram illustrating examples of a joint transmission (JT) technique and radio channels for each TRP according to a situation according to an embodiment of the disclosure. In FIGS. 7, 700 and 750 are diagrams illustrating a coherent joint transmission (C-JT) supporting coherent precoding between each cell, TRP, or/and beam, or non-coherent joint transmission (NC-JT) supporting coherent precoding between TRP or/and beam. The joint transmission operation described in FIG. 7 may operate on a non-beamforming basis in a band below 6 GHz, and may operate on a beamforming basis in a band above 6 GHz.

In C-JT, the same data (PDSCH) is transmitted in TRP A 705 and TRP B 715, and joint precoding is performed in multiple TRPs. This means that the TRP A 705 and the TRP B 715 transmit the same DMRS ports (e.g., DMRS ports A and B in both TRPs) for receiving the same PDSCH. In this case, the UE will receive one DCI for receiving one PDSCH demodulated by DMRS ports A and B.

In the case of NC-JT, different PDSCHs are transmitted in each cell, TRP, and/or beam, and individual precoding may be applied to each PDSCH. This means that TRP A 705 and TRP B 715 will transmit different DMRS ports for receiving the different PDSCHs (e.g., DMRS port A in TRP A and DMRS port B in TRP B). In this case, the UE will receive two types of DCI for receiving PDSCH A demodulated by DMRS port A and PDSCH B demodulated by another DMRS port B.

For example, in the case of downlink, the TRP A 705 allocates the first PDSCH using the first PDCCH, and data for the UE may be transmitted in the first PDSCH. The TRP B 715 allocates the second PDSCH using the second PDCCH, and data for the UE may be transmitted in the second PDSCH. In this case, the TRPs A and B connected to the wired/wireless backhaul or the base station server 720 may transmit the first PDSCH and the second PDSCH to be distinguished in the spatial domain based on the RRC information and the DCI of the first PDCCH and the second PDCCH.

As another example, in the case of downlink, the TRP A 705 allocates the first PDSCH and the second PDSCH of the TRP A 715 using the first PDCCH, and data for the UE may be transmitted in the first PDSCH and the second PDSCH. That is, the second PDCCH of the TRP A 715 may be omitted according to the scheduling scheme of the base station. In this case, TRP A may transmit the first PDSCH and the second PDSCH to be distinguished in the spatial domain based on the RRC information and the DCI of the first PDCCH.

For example, for uplink resource allocation, the TRP A (705 and 755) may allocate a first PUCCH or a first PUSCH by using the first PDCCH. The TRP B (715 and 765) may allocate a second PUCCH or a second PUSCH by using the second PDCCH. In this case, the TRP A (705 and 755) may indicate spatial domain information and frequency domain and time domain information of the first PUCCH or the first PUSCH based on the RRC information and the DCI of the first PDCCH. The TRP B (715 and 765) may indicate spatial domain information and frequency domain and time domain information of the second PUCCH or the second PUSCH based on the RRC information and the DCI of the second PDCCH.

As another example, for uplink resource allocation, the TRP A (705 and 755) may allocate the first PUCCH, the second PUCCH, the first PUSCH, or the second PUSCH by using the first PDCCH. In this case, TRP A may indicate spatial domain information and frequency domain and time domain information of the first PUCCH, the second PUCCH, the first PUSCH or the second PUSCH based on the RRC information and the DCI of the first PDCCH.

In the uplink scenario 750, the UE 760 may transmit uplink data or control information by performing the indicated transmission/reception (Tx/Rx) beamforming operation based on the channel and resource allocated in the TRP A or TRP B connected to the wired/wireless backhaul or the base station server 770. The reception (Rx) beamforming operation means that the UE receives downlink control information by performing beamforming in a beam direction configured or indicated by TRP A or TRP B, and the transmission (Tx) beamforming operation means that the UE performs beamforming by identifying an uplink beam direction according to the control information received from the TRP A or TRP B. The transmitted uplink data may include a payload (or data), HARQ-ACK, or CSI generated by the UE, and the control information (UCI) may include information such as HARQ-ACK or CSI. In the above description, TRP A and TRP B have been described as two separate TRPs, but on the terminal side, TRPs A and B may be configured and operated as one TRP or two or more TRPs because the index of the TRP is distinguished by the index of the beam rather than the index of the TRP explicitly.

As another example, in the case of NC-JT, it is possible to consider various radio resource allocations, such as when the frequency and time resources used by a plurality of TRPs are the same, when the frequency and time resources used by the plurality of TRPs do not overlap at all, and when some of the frequency and time resources used by multiple TRPs overlap. In addition, in order to allocate a plurality of PDSCHs to one UE at the same time for NC-JT support, DCIs of various types, structures, and relationships may be considered.

In the case of downlink, the operation of the C-JT or NC-JT may consider a scenario in which a signal (especially a data signal) is simultaneously received. Here, the simultaneous reception may be defined as a case in which time resources for receiving a signal from among 14 OFDM symbols in the same slot overlap in at least one or more symbols or a case in which all of them overlap. On the other hand, in the case of uplink, the operation of the C-JT or NC-JT may consider a scenario in which signals are transmitted simultaneously or with some time difference. Here, Simultaneous transmission may be defined as a case in which time resources for transmitting a signal among 14 OFDM symbols in the same slot overlap in at least one or more symbols or a case in which all of them overlap. When transmitting with a partial time difference, the UE may transmit an uplink signal with a time difference of at least one OFDM symbol or slot.

The meaning of the panel of the UE is described below.

The UE may define a panel for communication by performing Tx/Rx beamforming with the base station. The panel may be defined as one concept among various types, and for example, may be defined by a beam generated by the UE, a beam set, and a classification indicator in the form of distinguishing a beam book in order to communicate with the base station. As another example, the panel may be defined as a new ID for the UE panel. Specifically, when there are two panels in one UE, panel indicator 0 or 1 may be indicated to the UE to indicate uplink transmission in a specific panel. As another example, a new ID may be defined to be mapped to a downlink RS. That is, it is assumed that a downlink RS resource or RS resource set of a base station is mapped to a specific panel, and an ID corresponding to the downlink RS resource or resource set may be indicated. Specifically, in a state where there are two panels in one UE, and the base station configures CSI-RS resource sets #0, 1, 2, 3, etc. for the UE, the base station may map the CSI-RS resource sets #0 and 1 to panel ID 0 and the CSI-RS resource sets #2 and 3 to panel ID 1 to indicate the panel ID to the UE. As another example, the base station may indicate an uplink panel indicator to the UE. The base station may indicate a new UL panel for each SRS resource set or SRS resource configured in the RRC configuration. That is, per at least one specific SRS resource set or SRS resource, one or more UL panels may be associated, which may be explicitly or implicitly indicated. At this time, if the UE supports two panels, the base station may explicitly indicate #0, or/and 1 separately as a panel ID, and if the panel ID is not explicitly indicated, the base station may indicate the panel to be used based on the setting of the spatialRelationInfo parameter using higher layer signaling defined in rel-15 and the configured SRS information. Alternatively, the beam generated, operated, and managed by the base station in the UE may be defined in a mapped form with an indicator such as an SRS resource indicator indicating an SRS resource transmitted in uplink.

As another example, the panel may include at least one of a form that can be classified or indexed in a logical form that the base station can distinguish, a form that can be classified or indexed into a physical form that the base station can distinguish, and a form that is configured so that the logical form and the physical form are linked and distinguished. As another example, the panel may be mapped to at least one partial antenna (module) or a plurality of antennas (modules), antenna (module) groups, etc. in the UE.

According to the above-defined panel, the UE may support various categories of capabilities in uplink transmission.

Multi-panel UE (MPUE) type 1: In operation for a plurality of panels in a UE, only one panel is activated at a time, and some delay time may occur in activating and switching the panel MPUE type 2: In operation for a plurality of panels in a UE, a plurality of panels are activated at one time, and one or a plurality of panels can be used for transmission MPUE type 3: In operation for a plurality of panels in a UE, a plurality of panels are activated at one time, and only one panel can be used for transmission The MPUE type is information that can be included in UE capability, and the panel activation may mean a state in which a modem and an RF chain are at least powered on for uplink transmission and power adjustment is possible, a state in which a PA (power amplifier) is activated, and a state in which transmission preparation is completed. That is, when the base station receives the MPUE type information (this can be interchangeably with MPUE category information and MPUE pattern information), the base station may use the information to instruct the UE to perform UL beamforming. According to an example of the above utilization, the UE receiving the activation indication information of a specific panel from the base station may operate to turn off the power of some panels of the UE not indicated while the UE operates to turn on the power of the indicated panel, or may operate to turn on the power of the panel in some cases. The activation state for Tx beamforming of the UE may be distinguished from the activation state for Rx beamforming, and the activation state for Rx beamforming may not necessarily be a prerequisite.

Figure 8A:
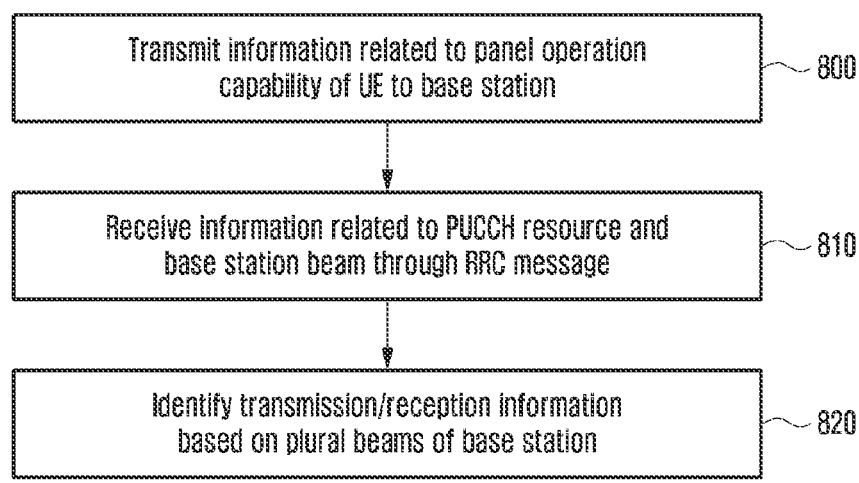
FIG. 8A is a diagram illustrating an example of an operation of a UE receiving panel operation related information of the UE.

FIG. 8A is a diagram illustrating an example of an operation of a UE receiving panel operation related information of the UE. As illustrated in FIG. 8A, the UE may transmit panel operation capability related information to the base station like UE capability (800). The panel operation capability related information may be information on the MPUE type described above. The base station receiving the information may consider the MPUE type in scheduling the uplink transmission of the UE. In the RRC configuration for the UE, the base station may transmit a configuration message related to the UE and the PUCCH resource and the base station and beam related information in the RRC configuration message for the UE (810). The UE receives this information. Thereafter, the UE may identify the configured plurality of beams or plurality of panel-based transmission/reception information (820).

Figure 8B:
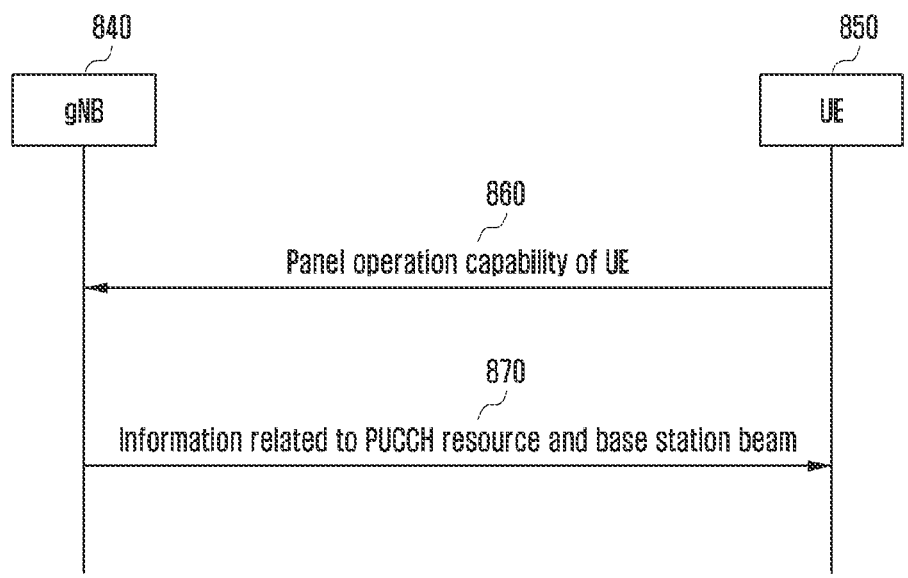
FIG. 8B is a diagram illustrating an example of operations of a base station and a UE that have received panel-related capability information of the UE.

FIG. 8B is a diagram illustrating an example of operations of a base station and a UE that have received panel-related capability information of the UE. For example, the base station 840 receives the panel capability information transmitted by the specific UE 850 (860), and when receiving that the capability information of the UE 850 is MPUE type 1, the base station 840 may allocate a PUCCH resource and a PUSCH resource so that the UE 850 may activate a plurality of panels, but only one panel may be used for uplink transmission. In addition, because a plurality of panels are not activated, the base station 840, in consideration of the switching delay between panels, allocates PUCCH, PUSCH, SRS configuration and configuration information transmission so that the UE 850 can perform uplink transmission using only one panel (870). The base station 840 may not allocate resources for uplink transmission in a plurality of spatial domains in consideration of the capabilities of the UE 850. Specifically, the base station 840 may indicate a specific panel of the UE 850 when scheduling PUCCH resources for HARQ-ACK or UCI information at one time point, and then perform the reception operation by performing Rx beamforming only in the direction transmitted from the specific panel of the UE 850 at the time of HARQ-ACK or UCI transmission of the UE. In addition, when the spatial domain of uplink transmission is changed (for example, when changing a beam in PUCCH or RS resource, SRS resource allocation and PUCCH, PUSCH resource configuration with different spatialRelationInfo), the base station 840 may allocate resources by separating the resources in consideration of the delay time in units of slots or in units of a plurality of symbols. If the resource allocated by the base station 840 is allocated while ignoring the switching delay of the UE 850, the UE 850 may not transmit or fail the corresponding transmission indicated by the base station.

As another example, when the base station 840 receives that the panel capability information transmitted by the specific UE 850 is MPUE type 3, the base station 840 may allocate the PUCCH resource and the PUSCH resource so that the UE 850 can activate a plurality of panels, but only one panel can be used for uplink transmission. That is, because the UE 850 has a plurality of panels activated, a switching delay between the panels may not be considered, and in consideration of the constraint used to transmit only one panel, the base station 840 may not allocate resources for uplink transmission of a plurality of spatial domains. Specifically, the base station 840 may indicate a specific panel of the UE when scheduling PUCCH resources for HARQ-ACK or UCI information at one time point, and then may perform a reception operation by Rx beamforming only in a direction transmitted from a specific panel of the UE at the time of HARQ-ACK or UCI transmission of the UE.

Hereinafter, a method for the base station to indicate the UE a panel for uplink transmission will be described.

Hereinafter, a method of indicating transmission of UCI without panel designation signaling will be described.

It was not a problem for a UE supporting NR Release 15 (Rel-15) to receive a downlink signal or transmit an uplink signal through a panel on the UE side. This is because the base station has decided that the use of the UE's panel is not specified in the standard without defining the UE's panel (transparent, however, does not exclude the case of operating in the implementation of the UE or/and the base station, which means that the panel identifier or separator is not separately defined or used in the standard). First, among the methods for indicating the uplink beam direction of the Rel-15 UE, if there is beam correspondence between beams received in downlink, the uplink beam may be regarded as a downlink beam. In this case, the UE may transmit the uplink signal by fixing the beam for receiving the downlink signal. That is, it may be assumed that the PUSCH beam is basically the same as the PDSCH beam. Second, in the case of UCI transmission using PUCCH corresponding to downlink data transmission, an uplink beam may be determined and operated through PUCCH spatial relation activation/deactivation through MAC CE. In this case, upon receiving the PUCCH resource ID, the UE receiving the assigned MAC CE message may identify the transmission direction of the UL beam through each index ($S_i$) of the activated beam. Third, in the case of PUSCH transmission, the change of the PUSCH beam may be indicated in TCI states through MAC CE. However, because the change of the UL beam indicated by the PDCCH is indicated by the RRC and MAC CE, it is impossible to dynamically indicate the change of the UL beam according to rel-15.

The above various methods are currently supported for Rel-15, and based on this, a method for transmitting and receiving a plurality of beams discussed in Release 16 (Rel 16) may be extended and proposed.

Method 1: If the concept of Rel-15 is extended in a narrow range, DCI may not designate a panel of the UE separately. That is, the absence of a separate indication for designating a panel of the UE in DCI nay be understood as allowing the UE to transmit and receive downlink and uplink signals, respectively, using only the panel from which the downlink signal is received. This means that there is no separate indicator in the DCI, and the UE uses the Rx beamforming configuration and setting used for downlink signal reception to be fixed and used for uplink signal transmission. Accordingly, the base station may expect the uplink signal reception of the UE based on downlink RS beamforming based on downlink signal transmission.

Method 2: By applying concepts such as a primary beam (or, main beam or major beam) and secondary beam (or, sub beam, or ancillary beam), the uplink and downlink transmission/reception beams of the UE may be managed. The primary beam (P-beam) may be basically determined by the instruction of the base station, and the primary panel (P-panel) may be determined based on receiving the primary beam of the base station. In addition, the secondary panel (S-panel) may be determined based on receiving the secondary beam of the base station.

For example, based on the beam pair connected in the initial access process, the UE may determine the P-beam for the uplink and the downlink beam for the beam pair, or a P-panel for a panel used to receive the beam pair at this time. In this case, the UE may determine the beams in other directions (for example, a beam directed by the TCI states indication) indicated by the beam indication of the base station other than the P-beam or P-panel as the S-beam, and may determine the panel other than the P-panel as the S-panel. As another example, a beam mapped to the lowest index in TCI states configured for RRC signaling or a beam configured as a default may be designated as a default P-beam. In addition, the base station and the UE may determine the panel used to receive the P-beam as the P-panel. In this case, base station and the UE may determine the beams in other directions (for example, a beam directed by the TCI states indication) indicated by the base station through beam indication other than the P-beam or P-panel as the S-beam, and the panel other than the P-panel may be determined as the S-panel. As another example, a beam having the best channel state among a plurality of beams received by the UE may be designated as a P-beam.

The reason for distinguishing the P-beam and the S-beam is that the direction of the beam for transmitting the UCI or PUSCH transmitted by the UE may be different depending on the case in which the UE can transmit at least two beams at the same time and the case in which the UE cannot transmit. For example, when the UE needs to transmit two beams within one slot or during a plurality of symbols (e.g., in case of MPUE type 2), the UE may transmit UCI and uplink data, respectively, based on each PUCCH resource ID configured in the P-beam and the S-beam and the corresponding UL beam index. As another example, if the UE can transmit only one beam within one slot or during a plurality of symbols (e.g., MPUE types 1 and 3), the UE may determine that the uplink signal and data are transmitted only through the P-beam. For this, the base station may consider the corresponding scheduling in DCI.

Like the Rel-15 UE, the Rel-16 UE may identify the direction of the beam for PUCCH transmission and the location of the resource based on the previously configured RRC information and the PUCCH resource indicator value confirmed through P-beam and S-beam PDCCH decoding at a specific time point.

In particular, when the uplink signal transmission time is the same slot and at least one symbol overlaps, if the PUCCH resource indicator has the same value, the UE may transmit the HARQ-ACK codebook or UCI in one beam (P-beam and S-beam are the same) using the designated resource. If the PUCCH resource indicator has a different value, the UE may transmit to the corresponding resource using only the P-beam determined by one of the various methods described above.

In this case, as the simplest method for the UE to transmit the UCI or HARQ-ACK codebook, the UE may transmit only the UCI or HARQ-ACK codebook corresponding to the P-beam. That is, this means that the UCI or HARQ-ACK codebook indicated to be transmitted using the S-beam can be dropped. In another method, similar to the LTE system, the UE may transmit UCI or HARQ-ACK codebook information by jointly coding, multiplexing and/or bundling, or integrating UCI or HARQ-ACK codebook corresponding to P-beam and UCI or HARQ-ACK codebook corresponding to S-beam by codebook design. In another way, similar to the NR system, the HARQ codebook design transmitted by Rel-15 may be equally applied. For HARQ-ACK codebook determination, Type-1 (semi-static method) and Type-2 (dynamic method) may be indicated and operated. The above classification may be determined by a value set as pdsch-HARQ-ACK-Codebook=semi-static or dynamic as described in TS 38.331.

A semi-static method is described as an example. Harq-ACK-SpatialBundlingPUCCH and harq-ACK-Spatial-BundlingPUSCH may be configured to "TRUE" or a corresponding field may be configured to absent. If configured to TRUE, 4 layers or more may be scheduled, otherwise it may be assumed to be configured to absent. When the codeword transmitted using multi-TRP or multi-beam is 2, the above maxNrofCodeWordsScheduledByDCI field may be set to 2, and if harq-ACK-SpatialBundlingPUCCH is set to TRUE, the codebook of the P-beam may be configured with HARQ-ACK corresponding to the first transport block (TB), and the codebook of the S-beam may be configured with the HARQ-ACK corresponding to the second transport block (TB). If the same data is transmitted (i.e., when one TB is repeatedly transmitted, or when two TBs are the same data), the P-beam codebook may be configured as HARQ-ACK corresponding to the first TB, and the S-beam codebook may be configured as NACK and transmitted.

Figure 9:
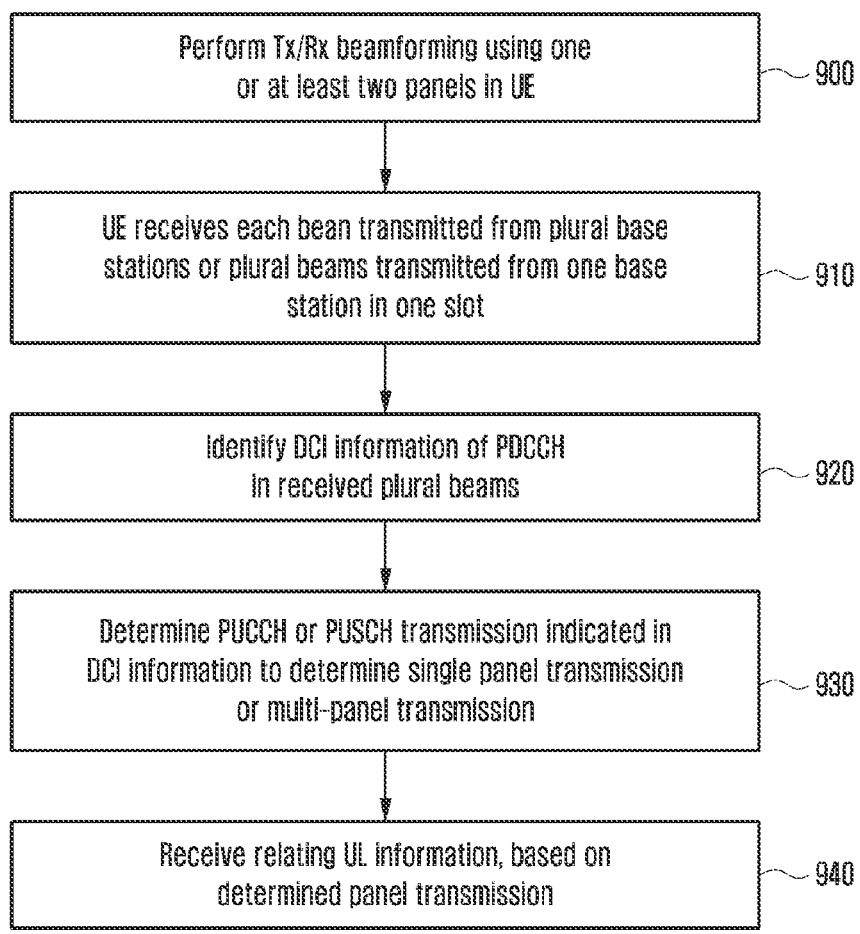
FIG. 9 is a diagram illustrating an example in which a UE transmits UCI without panel designation signaling in a transmission/reception operation using a plurality of panels.

FIG. 9 is a diagram illustrating an example in which a UE transmits UCI without panel designation signaling in a transmission/reception operation using a plurality of panels. The UE may perform Tx/Rx beamforming using one or at least two or more panels according to the MPUE type (900). By performing the beamforming, the UE may receive each beam transmitted from a plurality of base stations or a plurality of beams transmitted from one base station within one slot (910). The UE may identify the DCI of the PDCCH in the plurality of received beams (920). The UE may determine single-panel transmission and multi-panel transmission by determining PDCCH or PUSCH transmission indicated in the DCI (930). The UE may transmit related uplink information based on the determined panel transmission (940).

Hereinafter, a method of indicating transmission of UCI through panel-specific signaling will be described.

The base station or the TRP may explicitly indicate the panel ID of the UE to the UE. The explicit indication is possible by adding DCI bits in DCI formats 0_0, 0_1, 1_0, and 1_1 in Tables 2 to 5, changing a conventional field, or reinterpreting an existing field.

For example, an additional DCI bit may be added in DCI format 0_0, 0_1, 1_0, or 1_1. In this case, when the UE has two active panels, the UE may indicate the panel of the UE when receiving downlink data according to the form of a specific DCI format through the 1-bit indicator in DCI, which may also mean the panel of the UE for uplink data transmission or UCI transmission. In this case, in the interpretation of 1 bit, when the corresponding field is 0, it may explicitly indicate the P-panel currently undergoing downlink reception operation, and if it is 1, it may indicate an S-panel other than the P-panel. Although the above embodiment has been described as adding 1 bit, in the case of a rel-16 UE, an unused field in DCI format 0_0, 0_1, 1_0 or 1_1 may be used as a substitute, and the panel of the UE may be indicated without using an additional 1-bit field. For example, in Tables 2 to 5, a field constituting 1-bit DCI may be the target.

As another example, in DCI format 0_0, 0_1, 1_0 or 1_1, the panel of the UE may be indicated by a method of reinterpreting the DCI field used in rel-15. In the case of uplink, it may be interpreted that the uplink panel is indicated through an SRS resource indicator (SRI) in DCI of DCI format 0_1. By dividing the index value of the uplink panel indicator to be mapped to some SRS resource (or SRS resource set), the UE may transmit an uplink signal using the indicated panel. For example, when the SRI is 3 bits, each SRI indicates an SRS resource, but 000, 001, 010, and 011 are mapped to a P-panel and 100, 101, 110, and 111 are mapped to an S-Panel to indicate a panel of the UE together with the SRS resource. The UE may support uplink transmission according to the mapped value. Also, in the case of downlink, the UE may interpret that the TCI indicator in DCI of DCI formats 1_0 and 1_1 indicates the uplink panel.

In the case of two panels, the UE may check a specific 1 bit in the 3-bit field, or identify the indicated panel by dividing it in an even/odd form.

Hereinafter, a case in which a plurality of beams and a plurality of panels are used will be described.

When the first PUCCH resource and the second PUCCH resource are allocated to overlap at least partially on the time axis in two different TRPs, a method (PUCCH overlapping with PUSCH at the time domain for different TRPs) of determining and transmitting/receiving UCI of the UE of the base station will be described.

Before describing various embodiments, each scenario is first classified, and operations of the base station and the UE according to the divided scenarios, in particular, each of the MPUE types will be described in detail.

Scenario A: Scenario A is a scenario in which PDSCH and PUCCH resources for eMBB scheduled by PDCCH of TRP A and PUSCH resources for URLLC scheduled by PDCCH of TRP B overlap each other on the time axis.

Scenario B: Scenario B is a scenario in which PUCCH resources for PDSCH for URLLC scheduled by PDCCH of TRP A and PUSCH resources for eMBB scheduled by PDCCH of TRP B overlap each other on the time axis.

Scenario C: Scenario C is a scenario in which the PUCCH resource for the PDSCH for the URLLC scheduled by the PDCCH of TRP A and the PUSCH resource for the URLLC scheduled by the PDCCH of the TRP B overlap each other on the time axis.

Scenario D: Scenario D is a scenario in which the PUCCH resource for the PDSCH for the eMBB scheduled by the PDCCH of TRP A and the PUSCH resource for the eMBB scheduled by the PDCCH of TRP B overlap each other on the time axis.

Figure 10:
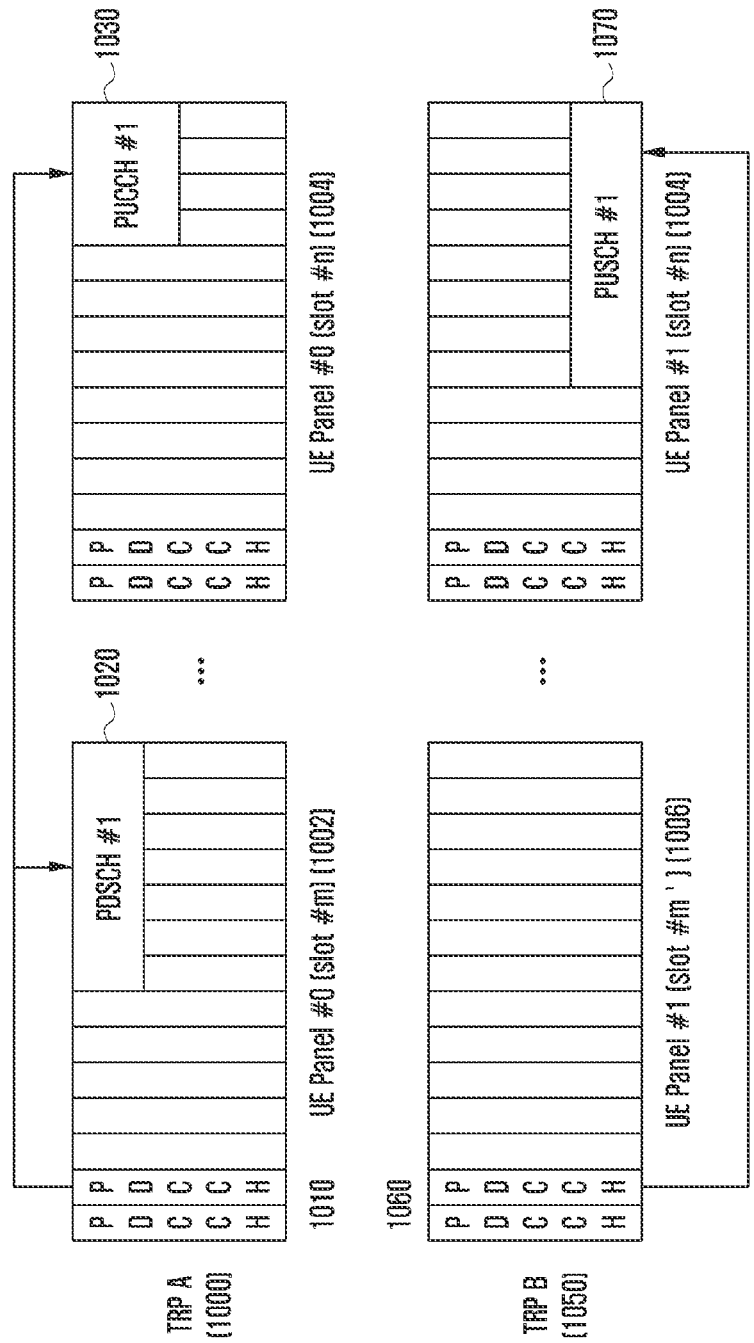
FIG. 10 is a diagram illustrating an example of a resource allocation structure of scenario A of the disclosure.

FIG. 10 is a diagram illustrating an example of the Scenario A. In FIG. 10, it is assumed that the panel receiving PDSCH #1 (1020) and PUCCH #1 (1030) allocated by TRP A (1000) is UE panel #0 (or P-panel) described above, and it is assumed that the panel receiving the PUSCH #1 (1070) allocated by the TRP B (1050) is the UE panel #1 (or S-panel) described above. The UE panels #0 and #1 may be understood as panels determined from the definition of the panel described above.

For example, the UE may be indicated by TRP A 1000 to transmit at least one UCI in the allocated PUCCH #1 (1030) resource of slot #n (1004) using UE panel #0 used to receive PDCCH (1010) of slot #m (1002). The UE may be indicated by TRP B 1060 to transmit at least one data to the allocated PUSCH #1 (1070) resource of slot #n (1004) using UE panel #1 used to receive PDCCH (1060) of slot #m' (1006). In this case, the PUCCH resource and the PUSCH resource scheduled by the base station in the slot #n 1004 overlap during at least one symbol period.

UE action Alternation A-1: When the sum of the transmit powers of PUCCH #1 (1030) and PUSCH #1 (1070) transmitted to each TRP is within Pcmax, a UE capable of transmitting multiple panels at one time, such as MPUE type 2 may transmit UCI and data on PUCCH #1 (1030) and PUSCH #1 (1070) using both panels #0 and #1.

UE action Alternation A-2: When simultaneous transmission is impossible using multiple panels at one time as in MPUE type 1 or 3, or when multiple panel transmission is possible as in MPUE type 2, but when the sum of the transmit powers of the two panels exceeds Pcmax, only single transmission is possible. As illustrated in FIG. 10, the UE selects (selects resource or selects panel) one of the PUCCH #1 (1030) resource allocated to transmit using UE panel #0 and the PUSCH #1 (1070) allocated to transmit using the UE panel #1 and performs transmission. The selection follows the panel designation method described below, which may be determined by the base station, may be determined by the UE, or may be determined by a set rule between the base station and the UE.

Alternation A-2-1: Next, a method of selecting a priority according to the characteristics of traffic will be described. In the first scenario, when the PUSCH for URLLC and the PUCCH for the eMBB overlap, the UE may transmit the PUSCH for the URLLC in consideration of the priority of the URLLC traffic, and drop the transmission of the PUCCH for the eMBB. As a method for the UE to determine the PUSCH for the URLLC, for example, it is possible to identify that the PDCCH scheduling the PUSCH is scrambled with a separate RNTI for the URLLC or has a separate DCI format. As another example, the base station may be implemented so that the PUSCH for URLLC is allocated to the P-beam. In some cases, when the PUSCH for URLLC is allocated to the S-beam, it does not exclude that the UE drops the PUSCH based on the P-beam.

Alternation A-2-2: Next, PUSCH multiplexing of UCI will be described. TRP A may be transmitted by multiplexing some or all of the UCI scheduled to be transmitted on the PUCCH by the UE to the PUSCH resource. The multiplexing operation of the UCI may be explicitly indicated in the PDCCH 1060 indicated in TRP B, or may be internally selected by a rule. The multiplexing may include a rate matching operation on PUSCH resources. That is, data transmitted through PUSCH may be rate-matched in consideration of a resource to which UCI is mapped.

Alternation A-2-3: Next, a method for selecting a priority according to whether repeated transmission or retransmission is described will be described. In the first scenario, when the base station indicates the UE to repeatedly transmit the UCI on the PUCCH resource for the eMBB, the UE may transmit the PUCCH for the eMBB and, conversely, may not perform the PUSCH transmission for the URLLC. Alternatively, when the UE fails to receive the PDSCH for the eMBB at least once and the base station retransmits the PDSCH and allocates the PUCCH, the UE transmits the PUCCH for the eMBB and conversely, the PUSCH transmission for the URLLC may not be performed.

Alternation A-2-4: Next, a method for selecting a priority according to a scheduling time of a base station will be described. The UE may preferentially perform transmission in which the scheduling of the base station is relatively latest. As an example, by comparing the slot #m (1002), which is the time when TRP A (1000) allocates the PUCCH resource, and the slot #m' (1006), which is the time when the TRP B (1050) allocates the PUSCH resource, if the slot #m (1002) is later than the slot #m' (1006), the UE may transmit the PUCCH #1 (1030) in the slot #n (1004), conversely, if the slot m'(1006) is a later time point, the UE may transmit the PUSCH #1 (1070) in the slot #n (1004).

Alternatively, the UE may preferentially transmit that the scheduling of the base station is performed relatively earlier. As an example, by comparing the slot #m (1002), which is the time when TRP A (1000) allocates the PUCCH resource, and the slot #m' (1006), which is the time when the TRP B (1050) allocates the PUSCH resource, if the slot #m (1002) is earlier than the slot #m' (1006), the UE may transmit the PUCCH #1 (1030) in the slot #n (1004), conversely, if the slot m' (1006) is an earlier time point, the UE may transmit the PUSCH #1 (1070) in the slot #n (1004). At this time, even when PUSCH transmission is selected, only when the time for the UE to decode the DC of the PDCCH indicating the beam change in the PUSCH transmission slot is insufficient or the decoding fails, the UE can preferentially transmit PUCCH #1 (1030) in the slot #n (1004).

Alternation A-2-5: A priority according to the starting symbol position of the allocated PUSCH or PUCCH resource may be determined. The base station or the UE may transmit that a symbol position starting with each resource allocated in slot #n 1004 starts first. For example, when the symbol index starting from PUSCH #1 (1070) is #6 and the symbol index starting from PUCCH #1 (1030) is #10, the UE may transmit data based on the PUSCH #1 (1070) resource, and on the contrary, may drop the PUCCH #1 (1030) resource-based transmission.

In the various embodiments, when PUCCH or PUSCH resources overlap, the base station may determine single transmission by selectively indicating to cancel one resource. As an example, the base station may cancel the PUCCH resource or transmit a PDCCH including an indicator indicating cancellation of the PUSCH resource to the UE between slot #m 1002 or slot #m' 1006 to slot #n 1004. Here, the UE that has successfully received the PDCCH may determine that the cancellation of the corresponding resource cancels the transmission of the UCI in the PUCCH resource and the transmission of the data packet in the PUSCH. As a result, the UE may perform PUCCH or PUSCH transmission based on allocated resources in addition to the canceled resources.

Figure 11:
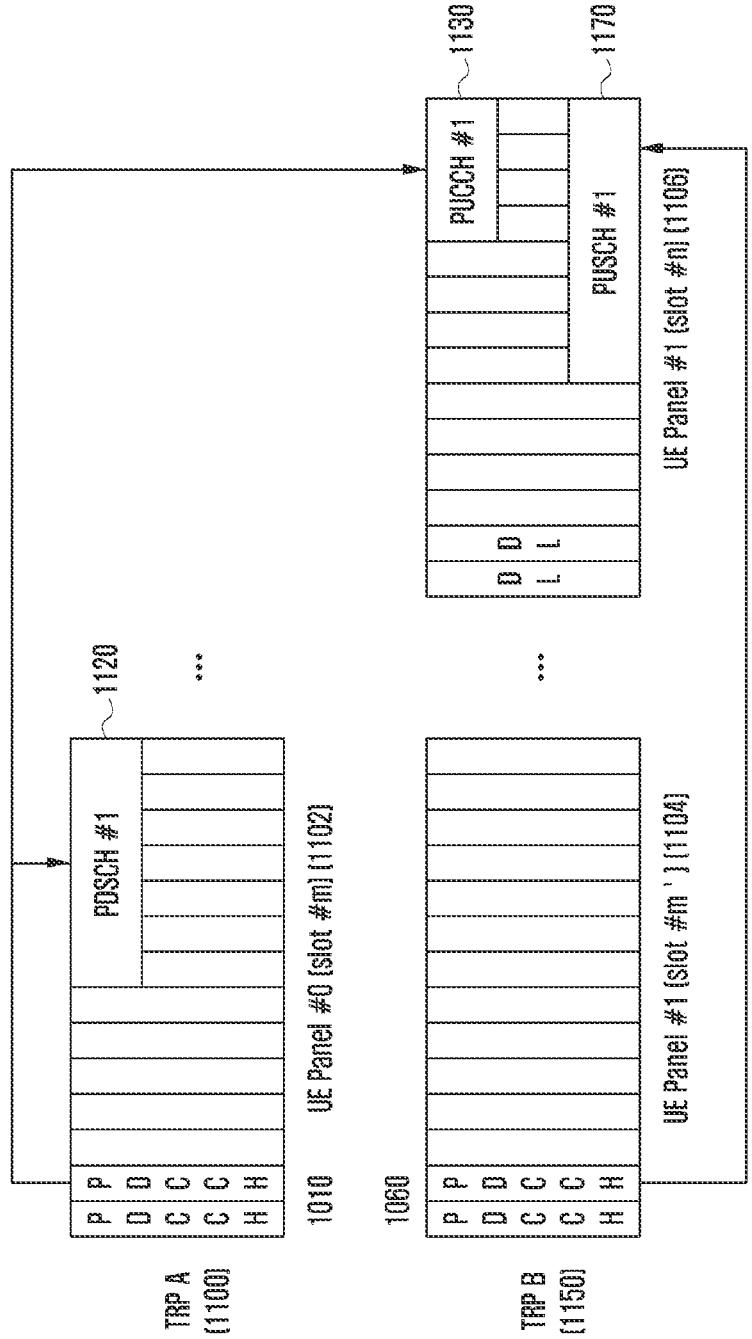
FIG. 11 is a diagram illustrating an example of another resource allocation structure of scenario A of the disclosure.

FIG. 11 is a diagram illustrating another example of the Scenario A.

UE action Alternation A-3: When simultaneous transmission using multiple panels at one time is not possible like MPUE types 1 and 3, and when, like in FIG. 11, TRP A (1100) allocates PUCCH #1 (1130) resources to transmit using the UE panel #1 of the UE and TRP B (1150) allocates PUSCH #1 (1170) resources to transmit using the UE panel #1 of the UE, the UE selects and transmits at least one of the two resources (PUCCH #1 (1130) and PUSCH #1 (1170)) using one panel.

For example, when the transmission beam of the TRP B 1150 is a P-beam as illustrated in FIG. 11, it may be understood that the time and frequency resources allocated to the UE through the PDCCH 1160 are implicitly designated as UE panel #1 that receives the P-beam.

As another example, the PDCCH (1110) transmitted by the TRP A (1100) explicitly indicates the UE panel, and based on this, the UE may transmit the PUCCH or the PUSCH using the UE panel #1.

As another example, when the UE transmits PUCCH and PUSCH, the UE may perform simultaneous transmission (OFDM support) or single transmission (SC-FDMA support) according to the determined waveform. When the UE needs to perform single transmission, the UE may multiplex the UCI of PUCCH #1 (1130) to PUSCH #1 (1170) and transmit it.

Figure 12:
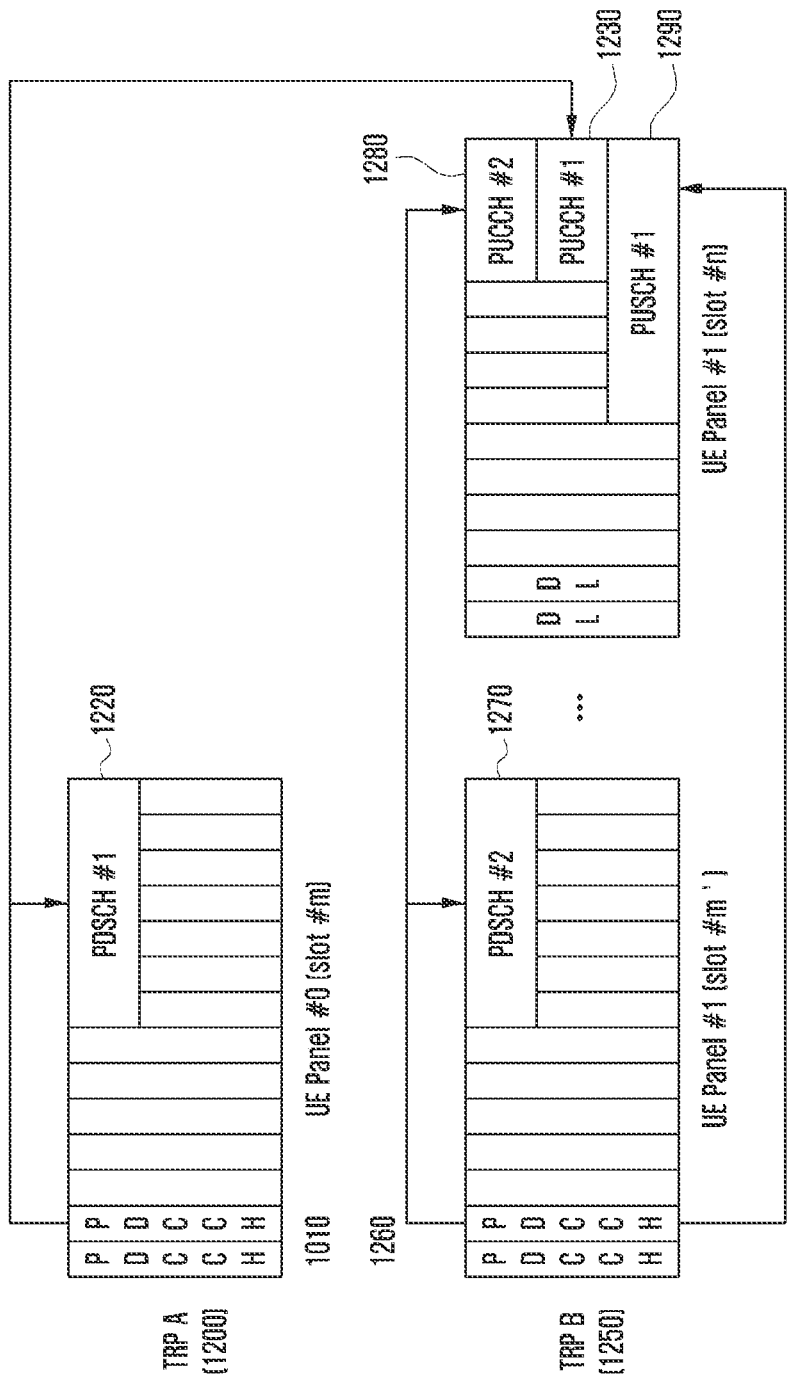
FIG. 12 is a diagram illustrating an example of another resource allocation structure of scenario A of the disclosure.

FIG. 12 is a diagram illustrating another example of the Scenario A.

UE action Alternation A-4: When simultaneous transmission using multiple panels at one time is not possible like MPUE types 1 and 3, and when, like in FIG. 12, TRP A (1200) allocates PUCCH #1 (1230) resources to transmit using the UE panel #1 of the UE and TRP B (1250) allocates PUCCH #2 (1280) and PUSCH #1 (1290) resources to transmit using the UE panel #1 of the UE, the UE may select and transmit at least one of the allocated resources (PUCCH #1 (1230), #2 (1280) resources and PUSCH #1 (1290) resources) by using one panel. In FIG. 12, PUCCH #1 (1230) and PUCCH #2 (1280) describe a case where they are orthogonal on the time and frequency axes, but in some cases, they may overlap on the time axis or on the frequency axis, and both on the time and frequency axes.

In the method of selectively transmitting the PUCCH and PUSCH configured here according to priority, it may be described separately according to the configuration of the UCI transmitted to the PUCCH.

Alternation A-4-1: An operation for separated HARQ-ACK/NACK is described.

For example, the PUCCH #1 (1230) and #2 (1280) resources for the HARQ-ACK of PDSCH #1 (1220) transmitted from TRP A (1200) and PDSCH #2 (1270) transmitted from TRP B (1250) may be explicitly configured by the NW (base station). At this time, in the configuration of the PUCCH resource, all PUCCH resources (e.g., PUCCH #1) configured in the first PUCCH resource group do not overlap with other PUCCH resources (e.g., PUCCH #2) in the second PUCCH resource group on the time axis (that is, they may be in a TDM relationship with each other). In this case, the UE may transmit the divided HARQ information for each PDSCH based on each PUCCH #1 and PUCCH #2 resource.

In another embodiment, it may be configured by the base station to guarantee TDM PUCCH resources for Multiple-TRP (TRP A, TRP B). In this case, the UE may transmit a divided HARQ message for each PDSCH.

In another embodiment, PUCCH resources allocated in Multiple-TRPs (TRP A, TRP B) may overlap each other. In this case, the UE may utilize both the allocated PUCCH resource and the PUSCH resource as a resource capable of transmitting the PUCCH.

Here, utilizing at least one of PUCCH #1 (1230) resources indicated by TRP A (1200) and PUCCH #2 (1280) resources indicated by TRP B (1250), the UE transmits the HARQ-ACK of PDSCH #1 (1220) scheduled by TRP A (1200), and the HARQ-ACK transmission of PDSCH #2 (1270) scheduled by TRP B (1250) may be transmitted together by multiplexing on PUSCH resources 1290. At this time, as a method of selecting one of the at least one PUCCH resource, the methods of Alternation A-2-1 to Alternation A-2-5 described above may be equally applied.

In addition, the UE may multiplex HARQ-ACK, which is the reception result of PDSCH #1 (1220) scheduled in TRP A (1200), and HARQ-ACK, which is the reception result of PDSCH #2 (1270), scheduled in TRP B (1250), to PUSCH #1 (1290) resources and transmit them together without utilizing both the PUCCH #1 (1230) indicated by TRP A (1200) and the PUCCH #2 (1280) resource indicated by TRP B (1250).

Alternation A-4-2: An operation of transmitting the joint HARQ-ACK is described. PUCCH resources allocated in Multiple-TRP (TRP A, TRP B) may overlap each other. In this case, the UE may utilize all of the allocated PUCCH resources and/or PUSCH resources as resources capable of transmitting UCI.

As an example, the UE may transmit the HARQ-ACK by multiplexing the HARQ-ACK to be transmitted in each PUCCH #1 (1230) and PUCCH #2 (1280) by utilizing at least one of the PUCCH #1 (1230) indicated by TRP A (1200) and the PUCCH #2 (1280) resource indicated by TRP B (1250). The description of the selection method may be equally applied when considering the PUCCH and PUSCH objects described in Alternation A-2-1 to Alternation A-2-5 as PUCCH and PUCCH. For example, the resource selected by priority may be based on p-beam (p-panel).

As another example, selecting and utilizing at least one of PUCCH #1 (1230) resources indicated by TRP A (1200) and PUCCH #2 (1280) resources indicated by TRP B (1250), the UE transmits the HARQ-ACK of PDSCH #1 (1220) scheduled by TRP A (1200), and the HARQ-ACK transmission of PDSCH #2 (1270) scheduled by TRP B (1250) may be transmitted together by multiplexing on PUSCH resources 1290. As a method of selecting one of the at least one PUCCH resource, the methods described in Alternation A-2-1 to Alternation A-2-5 may be equally applied by considering PUCCH and PUSCH targets as PUCCH and PUCCH.

As another example, the UE may multiplex HARQ-ACK, which is the reception result of PDSCH #1 (1220) scheduled in TRP A (1200), and HARQ-ACK, which is the reception result of PDSCH #2 (1270), scheduled in TRP B (1250), to PUSCH #1 (1290) resources and transmit them together without utilizing both the PUCCH #1 (1230) indicated by TRP A (1200) and the PUCCH #2 (1280) resource indicated by TRP B (1250).

As another example, when the UE transmits PUCCH and PUSCH, the UE may perform simultaneous transmission (OFDM support) or single transmission (SC-FDMA support) according to the determined waveform. If the UE supports only single transmission and there is a problem of power limitation, the UE may multiplex the UCI of PUCCH #1 (1230) or PUCCH #2 (1280) to PUSCH #1 (1290) and transmit it.

The description of the scenario B may be understood as reversing all assumptions of the scenario A with respect to FIGS. 10 to 12. That is, the scenario B is the scenario in which the resource of PUCCH #1 for PDSCH #1 for URLLC scheduled on the PDCCH of TRP A and the resource of PUSCH #1 for eMBB scheduled on the PDCCH of TRP B overlap each other on the time axis.

UE operation Alternation B-1: When the sum of the transmit powers of PUCCH #1 and PUSCH #2 transmitted to each TRP is within Pcmax, the UE capable of transmitting a plurality of panels at one time like MPUE type 2 may transmit UCI and data on PUCCH and PUSCH, respectively, using both panels #0 and #1.

UE operation Alternation B-2: When simultaneous transmission is impossible using multiple panels at one time as in MPUE type 1 or 3, or when multiple panel transmission is possible as in MPUE type 2 but the sum of the transmit powers of the two panels exceeds Pcmax, only single transmission is possible. As in the case of FIG. 10, the UE selects (selects resource or selects panel) one of the PUCCH #1 resource allocated to transmit using UE panel #0 and PUSCH #1 allocated to transmit using the UE panel #1 and performs transmission. The selection follows the panel designation method described below, which may be determined by the base station, may be determined by the UE, or may be determined by a set rule between the base station and the UE.

Alternation B-2-1: Next, a method of selecting a priority according to the characteristics of traffic will be described. In scenario B, when PUCCH for URLLC and PUSCH for eMBB resources overlap, the UE may transmit PUCCH for URLLC in consideration of the priority of URLLC traffic, and may not transmit PUSCH for eMBB. A method for the UE to determine the PUCCH for the URLLC is, for example, by confirming that the PDCCH scheduling the PUCCH is scrambled with a separate RNTI for the URLLC or has a separate DCI format. As another example, the base station may be implemented such that the PUCCH for URLLC is allocated to the P-beam. In some cases, when the PUCCH for URLLC is allocated to the S-beam, it does not exclude that the UE does not transmit the PUCCH based on the P-beam.

Alternation B-2-2: Next, PUSCH multiplexing of UCI will be described. TRP A may be transmitted by multiplexing some or all of the UCI scheduled to be transmitted on the PUCCH by the UE to the PUSCH resource. The multiplexing operation of the UCI may be explicitly indicated in the PDCCH indicated in TRP B or may be internally selected by a rule. The multiplexing may include a rate matching operation on PUSCH resources. That is, data transmitted through PUSCH may be rate-matched in consideration of a resource to which UCT is mapped.

Alternation B-2-3: Next, a method for selecting a priority according to whether repeated transmission or retransmission is described will be described. In the scenario B, when the base station indicates the UE to repeatedly transmit the UCI on the PUSCH resource for the eMBB, the UE may transmit the PUSCH for the eMBB and, conversely, may not perform the PUCCH transmission for the URLLC.

Alternatively, when the base station fails to receive the PUSCH for the eMBB at least once and the PUSCH is allocated so that the UE retransmits the PUSCH, the UE transmits the PUSCH for the eMBB and conversely, the PUCCH for the URLLC may not be transmitted.

Alternation B-2-4: Next, a method for selecting a priority according to a scheduling time of a base station will be described. The UE may preferentially perform transmission in which the scheduling of the base station is relatively latest. As an example, by comparing the slot #m, which is the time when TRP A allocates the PUCCH resource, and the slot #m', which is the time when the TRP B allocates the PUSCH resource, if the slot #m is later than the slot #m', the UE may transmit the PUCCH in the slot #n, and conversely, if the slot m' is a later time point, the UE may transmit the PUSCH in the slot #n.

Alternatively, the UE may preferentially transmit that the base station performs scheduling relatively earlier. As an example, by comparing the slot #m, which is the time when TRP A allocates the PUCCH resource, and the slot #m', which is the time when the TRP B allocates the PUSCH resource, if the slot #m is earlier than the slot #m', the UE may transmit the PUCCH in the slot #n, conversely, if the slot m' is an earlier time point, the UE may transmit the PUSCH in the slot #n. At this time, even when PUSCH transmission is selected, only when the time for the UE to decode the DCI of the PDCCH indicating the beam change in the PUSCH transmission slot is insufficient or decoding fails, the UE may preferentially transmit the PUCCH in the slot #n.

Alternation B-2-5: Priority according to the starting symbol position of the allocated PUSCH or PUCCH resource may be determined. The base station or the UE may transmit that a symbol position starting with each resource allocated in slot #n starts first. As an example, when the symbol index starting with PUSCH #1 is #6 and the symbol index starting with PUCCH #1 is #10, the UE may transmit data based on the PUSCH #1 resource and, conversely, may drop transmission based on the PUCCH #1 resource.

In the various embodiments, when PUCCH or PUSCH resources overlap, the base station may determine single transmission by selectively instructing to cancel one resource. As an example, the base station may cancel the PUCCH resource or transmit a PDCCH including an indicator indicating cancellation of the PUSCH resource to the UE in slot #n or between slot #m' and slot #n. Here, the UE that has successfully received the PDCCH may determine that the cancellation of the corresponding resource cancels the transmission of the UCI in the PUCCH resource and the transmission of the data packet in the PUSCH. As a result, the UE may perform PUCCH or PUSCH transmission based on allocated resources in addition to the canceled resources.

UE operation Alternation B-3: The UE operation based on the scenario B may not require a separate operation from the UE operation Alternation A-3.

UE operation Alternation B-3: The UE operation based on the scenario B may not require a separate operation from the UE operation, Alternation A-4. A method of selecting one from among a plurality of PUCCH resources (PUCCH #1, #2) may be equally applied considering the PUCCH and PUSCH targets described in Alternation B-2-1 to Alternation B-2-5 as PUCCH and PUCCH.

The scenario C is the scenario in which the PUCCH #1 resource for the PDSCH #1 for the URLLC scheduled by the PDCCH of TRP A and the PUSCH #1 resource for the URLLC scheduled by the PDCCH of the TRP B overlap each other on the time axis. When the characteristics of the traffic transmitted in each TRP are the same, because it cannot be classified by the priority of data packets or traffic, the UE may determine on which channel to transmit UCI and/or data in consideration of at least one of resource allocation, an operating beam, and a single transmission/reception panel.

UE operation Alternation C-1: When the sum of the transmit powers of PUCCH #1 and PUSCH #2 transmitted to each TRP is within Pcmax, a UE capable of transmitting a plurality of panels at one time like MPUE type 2 may transmit UCI and data to PUCCH and PUSCH, respectively, using both panels #0 and #1.

UE operation Alternation C-2: When simultaneous transmission is impossible using multiple panels at one time as in MPUE type 1 or 3, or when multiple panel transmission is possible as in MPUE type 2 but the sum of the transmit powers of the two panels exceeds Pcmax, only single transmission is possible. The UE performs transmission by selecting (resource selection or panel selection) one of a PUCCH #1 resource allocated to transmit using UE panel #0 and a PUSCH #1 allocated to transmit using UE panel #1. The selection follows the panel designation method described below, which may be determined by the base station, may be determined by the UE, or may be determined by a set rule between the base station and the UE.

Alternation C-2-1: Next, a PUSCH-based multiplexing method according to UCI information will be described. TRP A may be transmitted by multiplexing some or all of the UCI scheduled to be transmitted on the PUCCH by the UE to the PUSCH resource. The multiplexing operation of the UCI may be explicitly indicated in the PDCCH 1060 indicated by TRP B or may be internally selected by a rule. The multiplexing may include a rate matching operation on PUSCH resources. That is, data transmitted through PUSCH may be rate-matched in consideration of a resource to which UCI is mapped.

Alternation C-2-2: Next, a method for selecting a priority according to whether repeated transmission or retransmission is described. In scenario C, when the base station instructs the UE to repeatedly transmit UCI on the PUSCH resource for URLLC, the UE may transmit the PUSCH for URLLC and, conversely, may not perform PUCCH transmission for URLLC. Alternatively, when the base station fails to receive the PUSCH for URLLC at least once and the PUSCH is allocated so that the UE retransmits the PUSCH, the UE transmits the PUSCH for the URLLC and conversely, the PUCCH for the URLLC may not be transmitted.

Alternation C-2-3: Next, a method of selecting a priority according to a scheduling time of a base station is described. The UE may preferentially perform transmission in which the scheduling of the base station is relatively latest. As an example, by comparing the slot #m, which is the time when TRP A allocates the PUCCH resource, and the slot #m', which is the time when the TRP B allocates the PUSCH resource, if the slot #m is later than the slot #m', the UE may transmit the PUCCH in the slot #n, and conversely, if the slot m' is a later time point, the UE may transmit the PUSCH in the slot #n. Alternatively, the UE may preferentially transmit that the base station performs scheduling relatively earlier. As an example, by comparing the slot #m, which is the time when TRP A allocates the PUCCH resource, and the slot #m', which is the time when the TRP B allocates the PUSCH resource, if the slot #m is earlier than the slot #m', the UE may transmit the PUCCH in the slot #n, conversely, if the slot m' is an earlier time point, the UE may transmit the PUSCH in the slot #n. At this time, even when PUSCH transmission is selected, only when the time for the UE to decode the DCI of the PDCCH indicating the beam change in the PUSCH transmission slot is insufficient or decoding fails, the UE may preferentially transmit the PUCCH in the slot #n.

Alternation C-2-4: Priority according to the starting symbol position of the allocated PUSCH or PUCCH resource may be determined. The base station or the UE may transmit that a symbol position starting with each resource allocated in slot #n starts first. As an example, when the symbol index starting with PUSCH #1 is #6 and the symbol index starting with PUCCH #1 is #10, the UE may transmit data based on the PUSCH #1 resource and, conversely, may drop transmission based on the PUCCH #1 resource.

In the various embodiments, when PUCCH or PUSCH resources overlap, the base station may determine single transmission by selectively instructing to cancel one resource. As an example, the base station may cancel the PUCCH resource or transmit a PDCCH including an indicator indicating cancellation of the PUSCH resource to the UE in slot #m or between slot #m' and slot #n. Here, the UE that has successfully received the PDCCH may determine that the cancellation of the corresponding resource cancels the transmission of the UCI in the PUCCH resource and the transmission of the data packet in the PUSCH. As a result, the UE may perform PUCCH or PUSCH transmission based on allocated resources in addition to the canceled resources.

The scenario D is a scenario in which the PUCCH resource for the PDSCH for the eMBB scheduled by the PDCCH of TRP A and the PUSCH resource for the eMBB scheduled by the PDCCH of the TRP B overlap each other on the time axis. When the characteristics of the traffic transmitted in each TRP are the same, because it cannot be classified by the priority of data packets or traffic, the UE may determine on which channel and/or data to be transmitted in consideration of at least one of resource allocation, an operating beam, and a single transmission/reception panel. In the scenario D, the UE's selective transmission method may be the same as that of the C scenario method. Therefore, various embodiments of alternation C-1 to C-2-4 may be applied to scenario D as well.

In the above description, information corresponding to UCI has been mainly described with respect to HARQ-ACK, but this may be extended to various information such as channel state information (CSI) including RI, PMI, CQI, and the like.

A method of configuring the HARQ_ACK codebook is described below.

Figure 13:
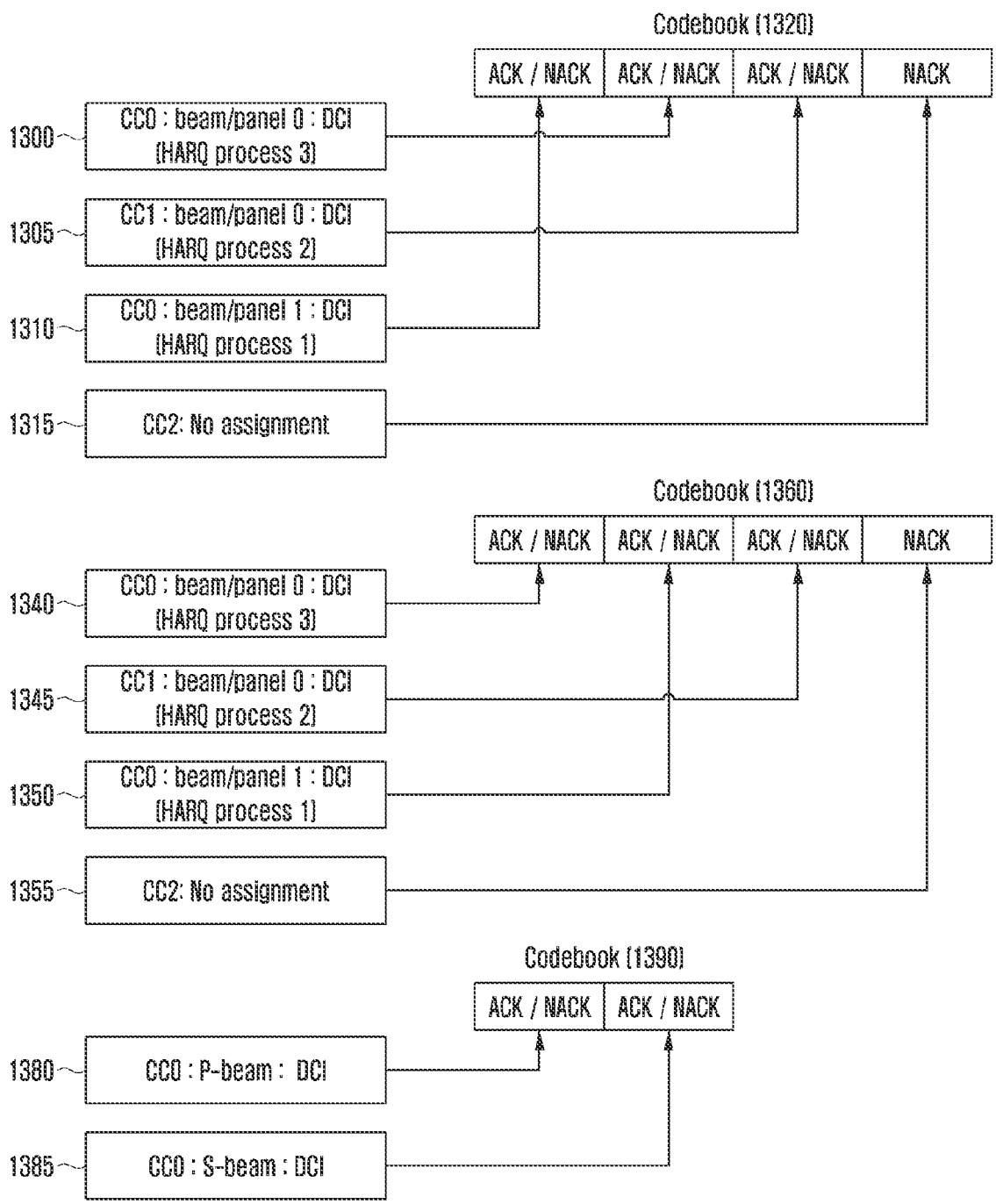
FIG. 13 is a diagram illustrating a method of configuring a HARQ-ACK codebook.

FIG. 13 is a diagram illustrating a method of configuring a HARQ-ACK codebook among the above-described UCIs.

In the configuration of the HARQ-ACK codebook, whether carrier aggregation (CA) is supported and whether a plurality of beams are received (separated by P/S-beam or panel index) may be considered together. According to the current NR system, when a plurality of PDSCHs are received in the same slot (e.g., reception of a plurality of beams, scheduling of each PDSCH in each beam), a rule for the codebook generation order is required.

When a plurality of PDSCHs are received through a plurality of beams in the same slot, the following method may be considered for configuring the HARQ-ACK codebook.

Method 1: HARQ process index order (codebook may be configured in the order of the lowest or highest HARQ process index indicated by DCI).

Specifically, when two HARQ process indexes such as 000 and 010 are received (that is, when data corresponding to HARQ process index 000, 010 is received), the UE first configures the HARQ-ACK value of the data having the HARQ process index of 000 in the codebook, and then configures the HARQ-ACK value of the data having the HARQ index of 010 in the codebook. When the code block group (CBG) is not supported, for example, if the decoding of each data received from the P-beam and the S-beam is successfully performed, the UE may transmit 11, and if decoding of data received in the P-beam succeeds and decoding of data received in the S-beam fails, the UE may transmit 01. The vice versa can easily be inferred.

Next, when supporting a plurality of component carriers (CC), an embodiment in which the codebook 1320 is configured in the order of HARQ process IDs indicated within the same CC will be described.

The UE may configure the HARQ-ACK codebook generated in one slot by bundling and/or multiplexing. The HARQ-ACK codebook may be generated by concatenating HARQ-ACK information in the order of 1310, 1300, 1305, and 1315 according to the method 1. At this time, 1310 means a case in which the UE receives the PDCCH using panel #1 (or S-panel) in the base station CC #0 and the HARQ process ID received in the PDCCH is 1, 1305 means a case in which the UE receives the PDCCH using panel #0 (or P-panel) in the base station CC #1 and the HARQ process ID received in the PDCCH is 2, 1300 means a case in which the UE receives the PDCCH using panel #0 (or P-panel) in the base station CC #0 and the HARQ process ID received in the PDCCH is 3, and 1315 means a case in which there is no data transmitted from CC2, respectively. 1315 may be excluded when CC2 is not configured. That is, considering the example of 1320, the HARQ-ACK codebook may be configured in ascending order of CC indexes, and in the case of the same CC index, in ascending order (or descending order) of HARQ process IDs.

Alternatively, HARQ-ACK codebook may be generated by arranging HARQ-ACK information corresponding to the HARQ process ID in ascending order (or descending order) regardless of the CC index. For example, when an ascending order of HARQ process IDs is applied, HARQ-ACK information may be connected in the order of 1310, 1305, 1300, and 1315.

Method 2: The codebook may be configured in the order of the lowest or highest panel indicator index based on the indicated panel index.

Specifically, when the panel indicator index is composed of 0 and 1, the UE first configures the HARQ-ACK value of the data having the panel indicator index of 0, and then configures the HARQ-ACK value of the data having the panel indicator index of 1. When the code block group (CBG) is not supported, for example, if the decoding of each data received from the P-beam (#0) and the S-beam (#1) is successfully performed, the UE may transmit 11, and if decoding of data received in the P-beam (#0) succeeds and decoding of data received in the S-beam (#1) fails, the UE may transmit 01. The vice versa can easily be inferred.

Next, an embodiment in which the codebook 1360 is configured in the order of the indicated panel indices within the same CC will be described in the case of supporting a plurality of CCs.

The UE may configure the HARQ-ACK codebook generated in one slot by bundling and/or multiplexing. The HARQ-ACK codebook may be generated by concatenating HARQ-ACK information in the order of 1340, 1350, 1345, and 1355 according to the method 2. At this time, 1340 means a case in which the UE receives the PDCCH using panel #0 (or P-panel) in the base station CC #0 and the HARQ process ID received in the PDCCH is 3, 1350 means a case in which the UE receives the PDCCH using panel #1 (or S-panel) in the base station CC #0 and the HARQ process ID received in the PDCCH is 1, 1345 means a case in which the UE receives the PDCCH using panel #0 (or P-panel) in the base station CC #1 and the HARQ process ID received in the PDCCH is 2, and 1315 means a case in which there is no additional data to be transmitted from CC2, respectively. 1315 may be excluded when CC2 is not configured. That is, the HARQ-ACK codebook may be configured in ascending order of the CC index, and in the case of the same CC index, in ascending order (or descending order) of the panel indication index.

Alternatively, the HARQ-ACK codebook may be generated by arranging the corresponding HARQ-ACK information in ascending (or descending) order of the panel index regardless of the CC index. For example, when the ascending order of HARQ process IDs is applied, HARQ-ACK information may be connected in the order of 1345, 1340, 1350, 1355, or 1340, 1345, 1350, and 1355. HARQ-ACKs corresponding to the same panel index may be arranged in the order of the CC index or the HARQ process index.

Method 3: An embodiment in which the P-beam is configured first and the codebook 1390 is configured after the S-beam will be described.

Specifically, based on the above-described various embodiments of configuring the P-beam first, the HARQ-ACK value is first configured according to the success of decoding the data transmitted from the P-beam, and then the HARQ-ACK value may be configured according to whether the data transmitted from the S-beam has been successfully decoded. The HARQ-ACK value 1380 according to the success of decoding the data transmitted from the P-beam and the HARQ-ACK/NACK value 1385 are sequentially configured according to the success of decoding the data transmitted from the S-beam.

Various embodiments of generating and listing the HARQ-ACK codebook may be configured for all CCs per each TRP. In addition, the HARQ-ACK codebook configuration may be performed by directly using the above-described index, or may be performed by combining or calculating at least some of the above-described indices. A method of indicating a multi-panel indication is described below.

The panel selection of the UE may be configured through a higher layer parameter (e.g., UE_TransmitPanelSelection) of the base station. The UE reports whether or not simultaneous transmission is supported by the UE capability, and based on this, the base station may consider simultaneous transmission when configuring uplink resources and panels. Here, simultaneous transmission may be defined based on at least one slot or symbol. In addition, when the upper layer parameter SRS-ResourceSet is configured as a parameter for panel selection or switching purpose, the UE may operate according to at least one of supported SRS panel selection or configuration dependent on port switching capability (e.g., SRS-TxSelection, Panel-TxSelection). The panel selection described above may be configured differently depending on the frequency band, BWP, and the like (i.e., mapped to a frequency band or BWP).

Meanwhile, the previously explained Tx panel configuration may be configured and selected together in connection with the Rx panel configuration. For example, when at least one panel is set as t1r1 (that is, one Tx and one Rx), t1r2, t2r1, t2r2, and etc., the UE may operate with one same Tx/Rx panel configuration, one Tx/Rx panel configuration in addition to Rx panel configuration, one Tx/Rx panel configuration in addition to Tx panel configuration, and two identical Tx/Rx panel configuration. Meanwhile, the set Tx panel configuration may be set and selected independently of the Rx panel configuration.

In addition, a UE configured to select only one Tx panel in the serving cell may not expect the following operation.
1. Two or more panels or antenna ports are configured for PUSCH and SRS for the configured serving cell
2. PUCCH and PUSCH transmission is configured to be transmitted simultaneously in each panel
3. Receiving DCI format 0_0, 0_1 indicating uplink resource allocation type 1

The above-described panel selection or switching may be supported through a specific DCI format transmitted by the base station. For example, the UE may identify the panel selection by checking the DCI of DCI format 0_1 or the format itself. In contrast, the panel selection or switching described above may not be supported through a specific DCI format transmitted by the base station. For example, the UE may identify the panel selection by checking the DCI of DCI format 0_0 or the format itself.

In addition, the plurality of panel operations described above may be supported through a specific DCI format transmitted by the base station. For example, the UE may identify the operation of a plurality of panels by checking the DCI of DCI format 0_1 or the format itself. Contrary to this, the described plurality of panel operations may not be supported through a specific DCI format transmitted by the base station. For example, the UE may identify the operation of a plurality of panels by checking DCI of DCI format 0_0 or the format itself.

Meanwhile, the UE may calculate the sum of power to each transmitted panel in power adjustment and power allocation so as not to exceed the maximum value.

A mapping method between the panel and the antenna port is described below.

Figure 14A:
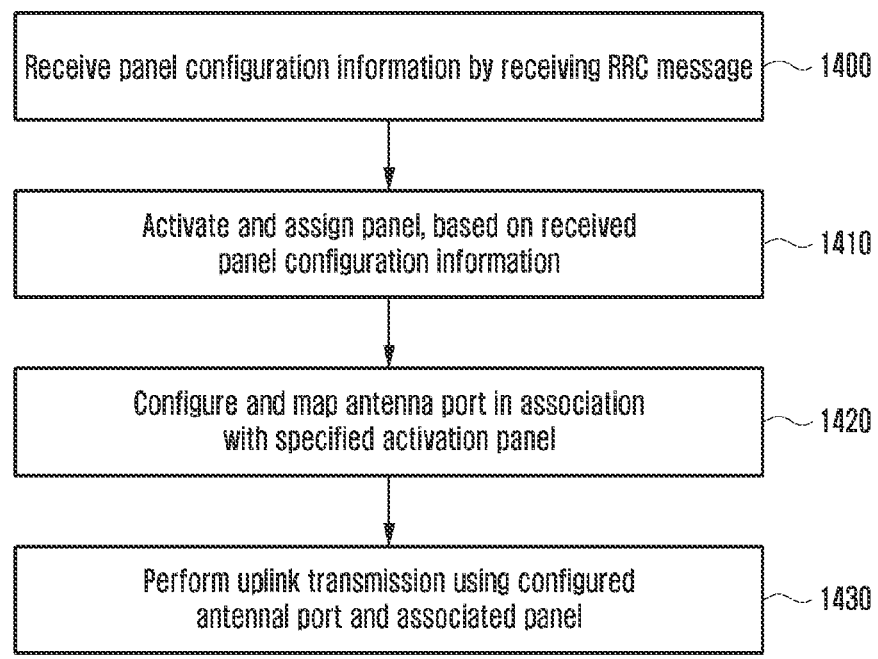
FIG. 14A is a diagram illustrating an example of an operation of performing uplink transmission using a panel and a mapped antenna port.
Figure 14B:
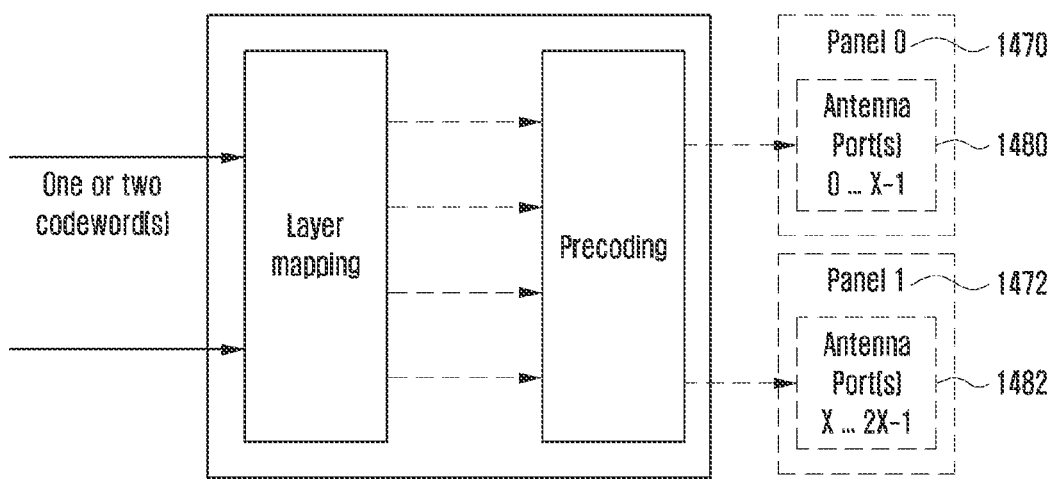
FIG. 14B is a diagram illustrating an example of association with an antenna port according to panel designation.

FIG. 14A is a diagram illustrating an example of an operation of performing uplink transmission using a panel and a mapped antenna port. In FIG. 14A, the UE receives an RRC message including panel configuration information from the base station (1400). The panel configuration information may include at least one of an identifier directly indicating the panel, an identifier for configuring DL or/and UL reference signal resources, and an identifier for setting a mapping relationship between DL or/and UL reference signal resources or PDSCH and PUSCH resources associated with downlink/uplink TCI states. The UE may check the designated panel based on the received panel configuration information and activate or deactivate the checked panel (1410). In this case, the panel mapping may be configured in consideration of beam correspondence. The UE may perform antenna port configuration or mapping in association with a designated activation panel (1420). The UE may determine the panel designation and antenna port mapping described above sequentially or simultaneously. FIG. 14B is a diagram illustrating an example of association with an antenna port according to panel designation. However, various embodiments of the disclosure are not limited to the illustrated cases. For example, panel 0 (1470) may be mapped to antenna ports 0 to X−1 1480 of a specific RS, and panel 1 1472 may be mapped to antenna ports X to 2X−1 1482 of a specific RS. The UE may transmit uplink data and control information to the panel and antenna port configured and instructed by the base station through a designation operation of the panel and antenna port (1430).

Hereinafter, operations of the base station and the UE when collision of uplink data collide in an uplink CA scenario will be described.

First, for uplink CA, the base station may configure one primary cell (PCell) and at least one secondary cell (SCell) to the UE. In addition, for uplink CA, the base station configures a plurality of cell groups in the UE to configure a master cell group (MCG) and a secondary cell group (SCG), respectively. Here, when MCG is configured for the UE, one PCell and at least one SCell may be configured for the UE, and when SCG is configured, one PSCell and at least one or more SCells may be configured with the UE. In this case, when the PCell or/and the PScell and the SCell are configured in the UE, the above-described various embodiments of FIGS. 10 to 12 may be similarly applied.

Figure 15:
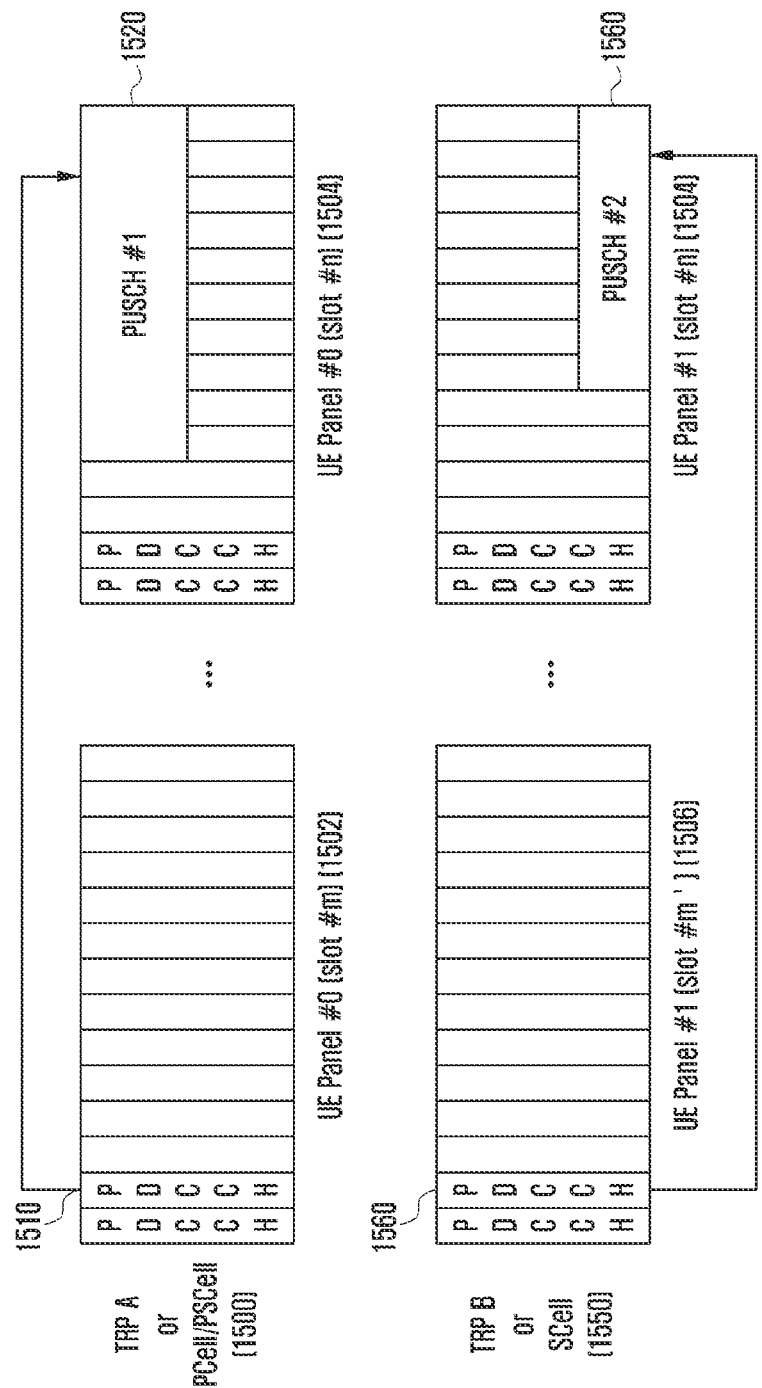
FIG. 15 is a diagram illustrating an example in which uplink data transmission collides in the case of uplink CA.

FIG. 15 is a diagram illustrating an example in which uplink data transmission collides in the case of uplink CA. According to FIG. 15, the UE may identify the PUSCH #1 (1520) resource and the transmission time scheduled in the PDCCH 1510 of the slot #m 1502 in the PCell/PSCell or TRP A 1500. In addition, the UE may identify the PUSCH #2 (1570) resource and transmission time scheduled in the PDCCH (1560) of the slot #m' (1506) in the SCell or TRP B (1550). Here, PUSCH #1 (1520), #2 (1570) may overlap at least one symbol on the time axis, and a transmission method of the UE may be determined according to at least one of various methods described below for PUSCHs #1 (1520) and #2 (1570) scheduled in the TRP A or B, or Pcell/PSCell or Scell.

Method 1: The UE may preferentially transmit a PUSCH indicated by a larger priority index value according to the PUSCH priority set by the base station. In this case, the UE may transmit a plurality of PUSCHs when simultaneous transmission is possible, but when the sum of the transmission powers of the two panels exceeds the maximum transmission power value, the UE may selectively perform transmission of a PUSCH having a high priority value. That is, a PUSCH having a low priority value may not be transmitted. When the sum of the powers of the panel or port used for transmission is less than the maximum power transmission value, the UE may perform PUSCH transmission in consideration of priority.

Method 2: The transmission method of the UE may be determined according to the assumption of a QCL (quasi co-location) of PUSCH of each panel indicated by the base station. Here, if the UE determines that the QCL assumption of the PUSCH indicated by the base station is different, when the sum of the powers of the panel or port used for transmission exceeds the maximum transmission power value, the UE transmits the PUSCH corresponding to the high priority value in consideration of the PUSCH priority and may not transmit the PUSCH corresponding to the low priority value, and when the sum of the powers of the panel or port used for transmission does not exceed the maximum transmission power value, the UE may transmit the transmittable PUSCH according to the priority in consideration of the priority of the PUSCH. In addition, if the UE determines that the QCL assumption of the PUSCH indicated by the base station is the same, the UE may select and transmit the PUSCH having the highest priority. In this case, the selection method may be defined according to the determination of the UE and the base station, or a rule defined in the implementation or standard of the UE.

In the above description, an example in which two CCs are configured is described, but an example in which three or more CCs are configured is not excluded, and cases in which three or more PUSCHs overlap can be easily understood and expanded.

Method 3: Previously, when UCI is transmitted in PUSCH, HARQ-ACK is mainly described among UCI, but the disclosure may be extended and applied even when CSI-related information is reported.

First, when resources for data transmission are allocated to PUSCH #1, resources are allocated to report aperiodic CSI or semi-persistent CSI to PUSCH #2, and when PUSCH #2 cannot be transmitted by the various scenarios described above, the UE may multiplex all or part of aperiodic CSI (e.g., information about wideband or subband) or semi-persistent CSI information to PUSCH #1 and transmit it. In addition, when sufficient resources for multiplexing CSI are not allocated to PUSCH #1, the UE does not perform the multiplexing and thus may drop the CSI.

Second, when resources for aperiodic CSI or semi-persistent CSI transmission are allocated to PUSCH #1, and resources are allocated so that another aperiodic CSI or semi-persistent CST is reported to PUSCH #2, and when PUSCH #2 cannot be transmitted by the various scenarios described above, the UE may be dropped according to the priority of CSI. In this case, the priority of CSI may be determined according to the rules illustrated in Table 14 below.

TABLE 14

CSI reports are associated with a priority value
$\text{Pri}_{iCSI}(y, k, c, s) = 2 \cdot N_{cells} \cdot M_s \cdot y + N_{cells} \cdot M_s \cdot k + M_s \cdot c + s$ where
y = 0 for aperiodic CSI report to be earned on PUSCH y = 1 for semi-persistent CSI reports to be carried on PUSCH y = 2 for semi-persistent CSI reports to be carried on PUCCH and y = 3 for periodic CSI reports to be carried on PUCCH;
k = 0 for CSI reports carrying L1-RSRP and k = 1 for CSI reports not carrying L1-RSRP;
c is the serving cell index and $N_{cells}$ is the value of the higher layer parameter maxNrofServingCells;
s is the reportConfigID and $M_s$ is the value of the higher parameter maxNrofCSI-ReportConfigurations.

The various embodiments described above have been described for a method of operating a plurality of panels. In addition to the method in which the base station configures or instructs the transmission panel of the UE, the UE may switch or deactivate the operation of the plurality of panels by itself. For example, the UE may operate by inactivating a specific panel or switching to another panel due to a problem such as heat of various materials such as an antenna, an RF circuit, a power amplification circuit, and a communication processing processor. Here, the operation of switching to another panel may be performed by adjusting the panel or antenna port configured by the above-described base station. As another example, the UE may deactivate or switch operations of a plurality of panels according to a battery state or a battery saving setting.

The panel or antenna switching operation of the UE described above may be performed to switch to a panel in charge of a panel supporting a low band, and may operate to switch to a panel in charge of 4G or 3G communication in 5G communication, 3G or 2G communication in 4G communication, and etc.

The deactivation may be performed temporarily based on a timer or may be operated at a time when heat generation and charging conditions are recovered.

When the operation of deactivating or switching the panel of the UE is previously performed, the UE may report that this operation was performed in the form of a message to the base station, and the base station may change the setting operation for the panel based on the received panel or antenna port related information message or may again instruct the UE to use the panel or antenna port.

Figure 16:
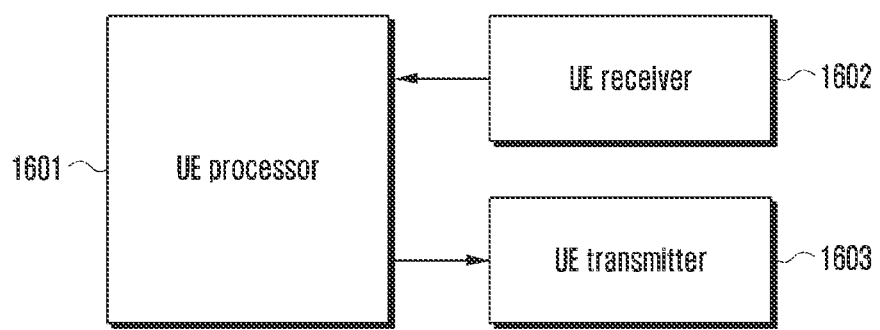
FIG. 16 is a block diagram illustrating an internal structure of a UE according to an embodiment of the disclosure.
Figure 17:
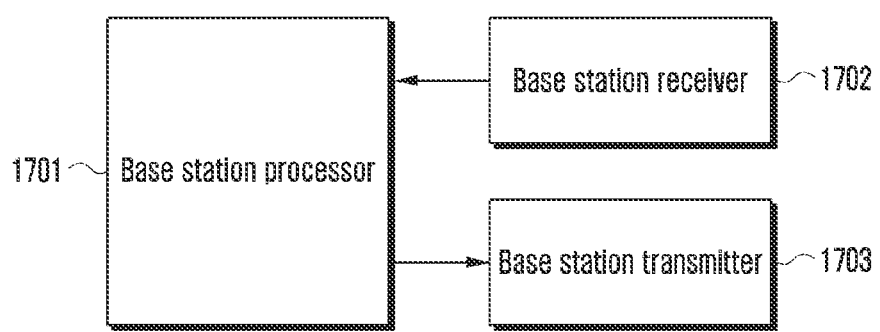
FIG. 17 is a block diagram illustrating an internal structure of a base station according to an embodiment of the disclosure.

In order to perform the above embodiments of the disclosure, a transmitter, a receiver, and a controller of the UE and the base station are illustrated in FIGS. 16 and 17, respectively. A transmitter, a receiver, and a processor of the base station and the UE should each operate according to the above-described embodiment.

Specifically, FIG. 16 is a block diagram illustrating an internal structure of a UE according to an embodiment of the disclosure. As illustrated in FIG. 16, the UE of the disclosure may include a UE processor 1601, a receiver 1602, and a transmitter 1603.

The UE processor 1601 may control a series of processes in which the UE may operate according to the above-described embodiment of the disclosure. In the embodiment of the disclosure, the UE receiver 1602 and the UE transmitter 1603 may be collectively referred to as a transceiver. The transceiver may include one or more Tx panels and/or one or more Rx panels. The transceiver may transmit/receive a signal to/from the base station. The signal may include control information and data. To this end, the transceiver may include an RF transmitter for up-converting and amplifying a frequency of a transmitted signal, and an RF receiver for low-noise amplifying and down-converting a received signal. In addition, the transceiver may receive a signal through a wireless channel and output it to the UE processor 1601, and transmit the signal output from the UE processor 1601 through a wireless channel.

FIG. 17 is a block diagram illustrating an internal structure of a base station according to an embodiment of the disclosure. As illustrated in FIG. 17, the base station of the disclosure may include a base station processor 1701, a receiver 1702, and a transmitter 1703.

The base station processor 1701 may control a series of processes in which the base station may operate according to the above-described embodiment of the disclosure. In the embodiment of the disclosure, the base station receiver 1702 and the base station transmitter 1703 may be collectively referred to as a transceiver. The transceiver may transmit/receive a signal to/from the UE. The signal may include control information and data. To this end, the transceiver may include an RF transmitter for up-converting and amplifying a frequency of a transmitted signal, and an RF receiver for low-noise amplifying and down-converting a received signal. In addition, the transceiver may receive a signal through a wireless channel and output it to the base station processing unit 1701, and transmit the signal output from the base station processing unit 1701 through the wireless channel.

Meanwhile, the foregoing details are provided for the convenience of understanding of the disclosure, and the disclosure is not limited thereto. That is, it is apparent to those of skilled in the art to which the disclosure pertains that other modifications are possible based on the technical spirit of the disclosure. In addition, each of the above embodiments can be utilized in combination with each other.

The invention claimed is:

1. A method performed by a user equipment (UE) of a communication system, the method comprising:
    receiving, from a base station, first downlink control information (DCI) associated with first priority information;
    receiving, from the base station, second DCI associated with second priority information;
    identifying that a resource of a physical uplink control channel (PUCCH) associated with the first DCI and a resource of a physical uplink shared channel (PUSCH) associated with the second DCI overlap on a time domain;
    in case that a priority of the PUCCH and a priority of the PUSCH are different based on the first priority information and the second priority information, transmitting, to the base station, one of the PUCCH and the PUSCH corresponding to a higher priority; and
    in case that the priority of the PUCCH and the priority of the PUSCH are identical based on the first priority information and the second priority information, multiplexing the PUCCH and the PUSCH,
    wherein the first priority information and the second priority information is obtained based on the first DCI and the second DCI,
    wherein the PUCCH or the PUSCH includes information on a hybrid automatic repeat request—acknowledgement (HARQ-ACK) codebook generated based on acknowledgment information bits for a plurality of downlink data, and
    wherein respective acknowledgment information bits for the plurality of downlink data are arranged in the HARQ-ACK codebook in an ascending order of cell indexes and in an ascending order of HARO process indexes corresponding to the plurality of downlink data for a same cell index.

2. The method of claim 1, further comprising
    receiving, from the base station, an indicator to cancel an uplink data transmission,
    wherein the indicator indicates to cancel the uplink data transmission of a specific resource.

3. The method of claim 1,
    wherein multiplexing the PUCCH and the PUSCH comprises rate-matching uplink data based on the uplink control information.

4. A method performed by a base station in a communication system, the method comprising:
    transmitting, to a user equipment (UE), first downlink control information (DCI) associated with first priority information; and
    transmitting, to the UE, second DCI associated with second priority information;
    wherein in case that a resource of a physical uplink control channel (PUCCH) associated with the first DCI and a resource of a physical uplink shared channel (PUSCH) associated with the second DCI overlap on a time domain, the method further comprises:

in case that a priority of the PUCCH and a priority of the PUSCH are different based on the first priority information and the second priority information, receiving, from the UE, one of the PUCCH and the PUSCH corresponding to a higher priority; and in case that the priority of the PUCCH and the priority of the PUSCH are identical based on the first priority information and the second priority information, receiving, from the UE, information multiplexed by the PUCCH and the PUSCH, wherein the first priority information and the second priority information is based on the first DCI and the second DCI, wherein the PUCCH or the PUSCH includes information on a hybrid automatic repeat request—acknowledgement (HARQ-ACK) codebook generated based on acknowledgment information bits for a plurality of downlink data, and wherein respective acknowledgment information bits for the plurality of downlink data are arranged in the HARQ-ACK codebook in an ascending order of cell indexes and in an ascending order of HARO process indexes corresponding to the plurality of downlink data for a same cell index.

5. The method of claim 4, further comprising, transmitting, to the UE, an indicator to cancel an uplink data transmission, wherein the indicator indicates to cancel the uplink data transmission of a specific resource.

6. The method of claim 4, wherein uplink data on the PUSCH is rate-matched based on the uplink control information.

7. A user equipment (UE) of a communication system, the UE comprising:

a transceiver; and a controller coupled with the transceiver and configured to:

receive, from a base station, first downlink control information (DCI) associated with first priority information, receive, from the base station, second DCI associated with second priority information, identify that a resource of a physical uplink control channel (PUCCH) associated with the first DCI and a resource of a physical uplink shared channel (PUSCH) associated with the second DCI overlap on a time domain, in case that a priority of the PUCCH and a priority of the PUSCH are different based on the first priority information and the second priority information, transmit, to the base station, one of the PUCCH and the PUSCH corresponding to a higher priority, and in case that the priority of the PUCCH and the priority of the PUSCH are identical based on the first priority information and the second priority information, multiplex the PUCCH and the PUSCH, wherein the first priority information and the second priority information is obtained based on the first DCI and the second DCI, wherein the PUCCH or the PUSCH includes information on a hybrid automatic repeat request—acknowledgement (HARQ-ACK) codebook generated based on acknowledgment information bits for a plurality of downlink data, and wherein respective acknowledgment information bits for the plurality of downlink data are arranged in the HARQ-ACK codebook in an ascending order of cell indexes and in an ascending order of HARO process indexes corresponding to the plurality of downlink data for a same cell index.

8. The UE of claim 7, wherein the controller is further configured to receive, from the base station, an indicator to cancel an uplink data transmission, and wherein the indicator indicates to cancel the uplink data transmission of a specific resource.

9. The UE of claim 7, wherein, to multiplex the PUCCH and the PUSCH, the controller is further configured to rate match uplink data on the PUSCH based on the uplink control information.

10. A base station of a communication system, the base station comprising:

a transceiver; and a controller coupled with the transceiver and configured to:

transmit, to a user equipment (UE), first downlink control information (DCI) associated with first priority information, and transmit, to the UE, second DCI associated with second priority information, wherein in case that a resource of a physical uplink control channel (PUCCH) associated with the first DCI and a resource of a physical uplink shared channel (PUSCH) associated with the second DCI overlap on a time domain, the controller is further configured to:

in case that a priority of the PUCCH and a priority of the PUSCH are different based on the first priority information and the second priority information, receive, from the UE, one of the PUCCH and the PUSCH corresponding to a higher priority, and in case that the priority of the PUCCH and the priority of the PUSCH are identical based on the first priority information and the second priority information, receive, from the UE, information multiplexed by the PUCCH and the PUSCH, wherein the first priority information and the second priority information is based on the first DCI and the second DCI, wherein the PUCCH or the PUSCH includes information on a hybrid automatic repeat request—acknowledgement (HARQ-ACK) codebook generated based on acknowledgment information bits for a plurality of downlink data, and wherein respective acknowledgment information bits for the plurality of downlink data are arranged in the HARQ-ACK codebook in an ascending order of cell indexes and in an ascending order of HARQ process indexes corresponding to the plurality of downlink data for a same cell index.

11. The base station of claim 10, wherein the controller is further configured to transmit, to the UE, an indicator to cancel an uplink data transmission, and wherein the indicator indicates to cancel the uplink data transmission of a specific resource.

12. The base station of claim 10, wherein uplink data on the PUSCH is rate-matched based on the uplink control information.

* * * * *

UNITED STATES PATENT AND TRADEMARK OFFICE
CERTIFICATE OF CORRECTION

PATENT NO. : 12,082,238 B2
APPLICATION NO. : 17/611439
DATED : September 3, 2024
INVENTOR(S) : Euichang Jung et al.

Page 1 of 1

It is certified that error appears in the above-identified patent and that said Letters Patent is hereby corrected as shown below:

In the Claims

In Column 42, Line 44, in Claim 1:
"indexes and in an ascending order of HARO process"
Should be:
-- indexes and in an ascending order of HARQ process --

In Column 43, Line 22, in Claim 4:
"indexes and in an ascending order of HARO process"
Should be:
-- indexes and in an ascending order of HARQ process --

In Column 44, Line 2, in Claim 7:
"indexes and in an ascending order of HARO process"
Should be:
-- indexes and in an ascending order of HARQ process --

Signed and Sealed this
Twenty-ninth Day of April, 2025

Coke Morgan Stewart
*Acting Director of the United States Patent and Trademark Office*